(12) United States Patent
Hamers et al.

(10) Patent No.: US 11,203,838 B2
(45) Date of Patent: Dec. 21, 2021

(54) METHOD FOR MANUFACTURING PAPER OR CARDBOARD

(71) Applicant: SOLENIS TECHNOLOGIES CAYMAN, L.P., George Town (KY)

(72) Inventors: Christoph Hamers, Ludwigshafen (DE); Hans-Joachim Haehnle, Ludwigshafen (DE); Kai Pahnke, Ludwigshafen (DE); Anton Esser, Ludwigshafen (DE)

(*) Notice: Subject to any disclaimer, the term of this patent is extended or adjusted under 35 U.S.C. 154(b) by 0 days.

(21) Appl. No.: 16/754,838

(22) PCT Filed: Oct. 1, 2018

(86) PCT No.: PCT/EP2018/076672
§ 371 (c)(1),
(2) Date: Apr. 9, 2020

(87) PCT Pub. No.: WO2019/072616
PCT Pub. Date: Apr. 18, 2019

(65) Prior Publication Data
US 2020/0240084 A1    Jul. 30, 2020

(30) Foreign Application Priority Data
Oct. 11, 2017 (EP) .................................... 17196027

(51) Int. Cl.
| | | |
|---|---|---|
| *D21H 23/04* | (2006.01) | |
| *D21H 17/45* | (2006.01) | |
| *C08F 218/00* | (2006.01) | |
| *D21H 21/18* | (2006.01) | |

(52) U.S. Cl.
CPC ......... *D21H 17/455* (2013.01); *C08F 218/22* (2020.02); *D21H 21/18* (2013.01); *D21H 23/04* (2013.01)

(58) Field of Classification Search
USPC ..................................................... 162/164.6
See application file for complete search history.

(56) References Cited

U.S. PATENT DOCUMENTS

| 10,626,558 B2* | 4/2020 | Esser | ................. D21H 17/67 |
|---|---|---|---|
| 2008/0156448 A1* | 7/2008 | Hund | ................. D21H 21/18 |
| | | | 162/164.6 |
| 2008/0196851 A1* | 8/2008 | Hund | ................. D21H 17/45 |
| | | | 162/164.6 |

FOREIGN PATENT DOCUMENTS

| EP | 0216387 | * | 1/1987 |
|---|---|---|---|
| WO | WO 2009/004078 | * | 1/2009 |
| WO | WO 2017/021483 | * | 2/2017 |

* cited by examiner

*Primary Examiner* — Mark Halpern
(74) *Attorney, Agent, or Firm* — Lorenz & Kopf, LLP

(57) ABSTRACT

A method for the production of paper or cardboard is provide comprising the following steps:
(A) Adding a water soluble polymer P to a first aqueous pulp suspension,
wherein polymer P is obtainable by
Polymerizing to a polymer V of
(i) 33 to 83 mol % of a monomer of formula I

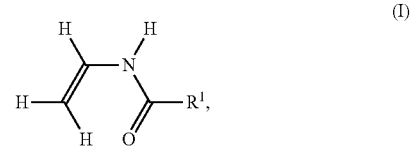

in which $R^1$=H or $C_1$-$C_6$ alkyl,
(ii) 6 to 56 mol % of diallyl dimethyl ammonium chloride, diallyl diethyl ammonium chloride or a salt form of a monoethylenically unsaturated monomer,
(iii) 11 to 61 mol % of a monoethylenically unsaturated carboxylic acid, sulfonic acid or phosphonic acid, or salt forms thereof,
(iv) 0 to 50 mol % of one or more ethylenically unsaturated monomers, and
hydrolyzing the N—C(=O)$R^1$ groups to form primary amino or amidine groups,
(B) dehydrating the second aqueous pulp suspension to a wet paper structure,
(C) dehydrating the wet paper structure.

20 Claims, No Drawings

METHOD FOR MANUFACTURING PAPER OR CARDBOARD

This application is a 371 of PCT/EP2018/076672 filed on 1 Oct. 2018

The invention concerns a method for the production of paper or cardboard comprising adding a polymer P to an aqueous pulp suspension, dehydrating said aqueous pulp suspension containing polymer P on a water-permeable substrate to a wet paper structure having a dry content between 18.5% by weight and 25% by weight and further dehydrating the wet paper structure to a paper or cardboard. The resulting paper or cardboard has a good dry strength. Further subject-matters of the invention are a paper or cardboard obtainable by this process and the polymer P.

The following trends in today's paper industry have a sometimes strongly negative influence on the dry strength of a paper or cardboard. The recycling rates of waste paper continue to rise. This is accompanied by shorter cellulose fibers and generally the use of cheap raw materials is attractive. The reduction of the grammage of a paper or cardboard to save raw materials is a constant topic. The water cycles in paper machines are being progressively closed. Methods for the production of paper or cardboard, which ensure good dry strength of the paper or cardboard obtained, are therefore interesting.

DE 19815946 A1 shows polymers obtained by radical-initiated polymerization of N-vinyl amides and optionally monoethylenically unsaturated carboxylic acids with 3 to 8 C atoms, for example acrylic acid or maleic anhydride, and optionally other copolymerizable co-monomers, e.g. styrene, and subsequent hydrolysis of the polymerized amide groups by caustic soda. These polymers are used in a retanning process of chrome leather to shoe upper leather.

DE3506832 A1 shows in the examples paper sheet production by dehydrating aqueous pulp suspensions without additives, by dehydrating aqueous pulp suspensions with prior addition of cationic polymers and by dehydrating aqueous pulp suspensions to which a cationic polymer and an anionic polymer with carboxylic acid groups have been added. The cationic polymers are polyethyleneimine, poly(dimethyl diallyl ammonium chloride), a condensate of adipic acid and diethylenetriamine crosslinked with epichlorohydrin, a poly(N-vinylimidazole) and a polyvinylamine. The inventive teaching is to increase the dry strength by adding a combination of a cationic polymer and an anionic polymer with carboxylic acid groups.

WO 2004/061235 A1 shows as inventive teaching the increase of paper strength values of manufactured paper sheets, in the production of which a partially hydrolyzed poly(N-vinylformamide) and a second polymer are added to the aqueous pulp suspension before dehydration. The second polymer is a cationic glyoxylated polyacrylamide or an anionic carboxymethylcellulose.

DE 10 2004 056551 A1 shows as inventive teaching the increase of the dry strength of manufactured paper sheets, in which an at least partially hydrolyzed poly(N-vinylformamide) and an anionic copolymer containing anionic acid is added to a pulp suspension before dehydration. The anionic copolymer is obtained by copolymerization of 30% acrylic acid and 70% N-vinylformamide.

US 2008/0196851 A1 shows as inventive teaching the increase in dry strength of manufactured paper sheets in which both a vinylamine containing copolymer obtained by Hofmann degradation of an acrylamide copolymer and an anionic polymer are added to a pulp suspension before dehydration.

There is a need for further methods for the production of paper or cardboard, whose obtained paper or cardboard has a good dry strength.

A method for the production of paper or cardboard was found, comprising the following steps:
(A) Adding a water-soluble polymer P to a first aqueous pulp suspension having a dry content between 0.1% by weight and 6% by weight, thereby forming a second aqueous pulp suspension containing polymer P, wherein the polymer P is obtainable by radical polymerization to a polymer V of
  (i) 33 to 83 mol % of a monomer of formula I

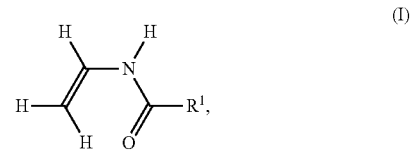

in which $R^1$=H or $C_1$-$C_6$ alkyl,
  (ii) 6 to 56 mol % of dalyl dimethyl ammonium chloride, diallyl diethyl ammonium chloride or a salt form of a monoethylenically unsaturated monomer with a quaternized nitrogen as the sole charge-bearing group at a pH value of 7,
  (iii) 11 to 61 mol % of a monoethylenically unsaturated carboxylic acid, a monoethylenically unsaturated sulfonic acid or a monoethylenically unsaturated phosphonic acid, or salt forms thereof,
  (iv) 0 to 50 mol % of one or several ethylenically unsaturated monomers other than monomer (i), (ii) and (iii),
  wherein the total amount of all monomers (i), (ii), (iii) and (iv) is 100 mol %, and,
  hydrolyzing the N—C(=O)$R^1$ groups of the units of the monomers of formula (I) polymerized into polymer V to form primary amino or amidine groups to polymer P, wherein at least 87% of the units of the monomers of formula (I) polymerized into polymer V are hydrolyzed, based on the number of all units of the monomers of formula I polymerized into polymer V,
(B) dehydrating the second aqueous pulp suspension containing polymer P on a water-permeable substrate to form a wet paper structure having a dry content between 18.5% by weight and 25% by weight,
(C) dehydrating the wet paper structure, resulting in the paper or cardboard.

Dry content is defined here as the ratio of the mass of a sample after drying to the mass of the sample before drying, expressed as a percentage by weight. Preferably, the dry content is determined by drying at 105° C. to mass consistency. This is done by drying at 105° C. (±2° C.) in a drying oven until mass constancy is achieved. Constancy of mass is achieved if, at dry contents of 1 to 100%, the rounded first decimal place of the percentage value no longer changes and, at dry contents of 0 to below 1%, the rounded second decimal place of the percentage value no longer changes. Drying is carried out at ambient pressure, possibly 101.32 kPa, without correction for any deviation due to weather and sea level. In the example section, under determination of dry content, notes on practical implementation may be found.

In step (A), first aqueous pulp suspension means a composition containing (a-a) water and (a-b) pulp containing cellulose fibers. An alternative term for pulp suspension is pulp.

Mechanical and/or chemical processes may be used to obtain the first aqueous pulp suspension. For example, grinding an aqueous pulp suspension is a mechanical process to shorten fibers and, in the case of cellulose fibers, also to defibrillate the fibers. The dehydration capacity of the aqueous pulp suspension is also determined by the freeness achieved. One method of measuring the freeness of a pulp suspension is to determine the dehydration kinetics according to Schopper Riegler in units of degrees Schopper Riegler (° SR).

All fibers from wood or annual plants commonly used in the paper industry may be used. Suitable annual plants for the production of pulp are, for example, rice, wheat, sugar cane and kenaf. Examples of mechanical pulps, e.g. from coniferous or deciduous woods, include mechanical pulp, thermomechanical pulp (TMP), chemo-thermomechanical pulp (CTMP), pressure pulp, semi-chemical pulp, high-yield pulp and refiner mechanical pulp (RMP). Groundwood pulp typically has a freeness of 40-60° SR compared to standard groundwood pulp with 60-75° SR and fine groundwood pulp with 70-80° SR. Pulps, e.g. from softwoods or hardwoods, include chemically digested sulfate, sulfite or soda pulp. Furthermore, pulp may also be bleached or unbleached. Preference is given to unbleached pulp, also known as unbleached kraft pulp. Unmilled pulp typically has 13-17° SR over low or medium milled pulp with 20-40° SR and high milled pulp with 50-60° SR. Recovered fibers may be derived from waste paper, for example. Optionally, the waste paper may be subjected to a prior deinking process. Mixed waste paper may typically have about 40° SR compared to waste paper from a deinking process with about 60° SR. Recovered fibers from waste paper may be used alone or mixed with other, especially native fibers.

The preferred process is one in which the first aqueous pulp suspension has a Schopper Riegler dehydration kinetics between 13 and 70° SR, very preferably between 20 and 60° SR and particularly preferably between 30 and 50° SR.

The first aqueous pulp suspension may be obtained by recycling existing paper or cardboard, for example by mechanically treating waste paper in a pulper together with water until the aqueous pulp suspension has the desired consistency. Another example of combining two fiber sources is mixing a primary pulp suspension with recycled waste from a coated paper produced using the primary pulp suspension.

The primary aqueous pulp suspension may contain, in addition to water (a-a) and pulp (a-b), other components which may be deliberately added to it or which may be present by using waste paper or existing paper.

At a dry content of more than 1.5% by weight to 6% by weight based on the first aqueous pulp suspension (corresponding approximately to a pulp concentration of more than 15 to 60 g/l if almost exclusively pulp is present), preferably from 2.0% by weight to 4.0% by weight, this is referred to as thick stock. A distinction is made here between a dry content of 0.1% by weight to 1.5% by weight, usually referred to as thin stock, based on the aqueous pulp suspension (corresponding approximately to a pulp concentration of 1 to 15 g/l if almost exclusively pulp is present), in particular 0.3% by weight to 1.4% by weight. The dry content or dry weight of an aqueous pulp suspension comprises all components which are non-volatile or, preferably, non-volatile in the determination of dry content by drying at 105° C. to constant mass.

The dry content of the first aqueous pulp suspension is preferably between 0.11% by weight and 5% by weight, very preferably between 0.12% by weight and 4% by weight, particularly preferably between 0.13% by weight and 3% by weight, 2% by weight, 1% by weight, 0.6% by weight or 0.35% by weight as the upper limit and very particularly preferably between 0.14% by weight and 0.30% by weight.

Preferably, polymer P is added in step (A) to a first pulp suspension whose dry content is greater than 1.5% by weight and up to 6.0% by weight. Very preferably the resulting second pulp suspension containing polymer P is then diluted to a dry content of between 0.1% by weight and up to 1.5% by weight. Preferably, polymer P is added in step (A) to a first pulp suspension whose dry content is between 0.1% by weight and up to 1.5% by weight.

After adding polymer P to the first aqueous pulp suspension, with the dehydration in step (B) is preferably waited from 0.5 seconds to 2 hours, very preferably from 1.0 seconds to 15 minutes and particularly preferably from 2 to 20 seconds. This ensures a reaction time of polymer P.

A process in which the amount of polymer P added is 0.01% to 6.0% by weight based on the dry content of the first aqueous pulp suspension is preferred. The amount of polymer is the solid content of polymer. Very preferably an amount of 0.02% by weight to 5.0% by weight, particularly preferably 0.03% by weight to 1.0% by weight, very particularly preferably 0.04% by weight to 0.8% by weight, especially preferably 0.06% by weight to 0.6% by weight and very especially preferably 0.1% by weight to 0.5% by weight.

A polymer P is water-soluble if its solubility in water under normal conditions (20° C., 1013 mbar) and pH value 7.0 is at least 5% by weight, preferably at least 10% by weight. The percentages by weight refer to the solid content of polymer P. The solid content of polymer P is determined after its production as an aqueous polymer solution. A sample of the polymer solution in a metal lid is dried in a convection dryer at 140° C. for 120 minutes. Drying is carried out at ambient pressure, possibly 101.32 kPa, without correction for any deviation due to weather and sea level.

The precursor of polymer P is the non-hydrolyzed polymer V, which is obtained by radical polymerization of monomers (i), (ii), (iii) and optionally (iv).

Solution, precipitation, suspension or emulsion polymerization is available for polymerizing the monomers (i), (ii), (iii) and optionally (iv) to polymer V. Solution polymerization in aqueous media is preferred. Suitable aqueous media are water and mixtures of water and at least one water-miscible solvent, e.g. an alcohol. Examples for an alcohol are methanol, ethanol, n-propanol, ethylene glycol or propylene glycol. Polymerization is carried out by radical means, for example by using radical polymerization initiators, for example peroxides, hydroperoxides, so-called redox catalysts or azo compounds which decompose into radicals. Examples for peroxides are alkali or ammonium peroxide sulfates, diacetyl peroxide, dibenzoyl peroxide, succinyl peroxide, di-tert-butyl peroxide, tert-butyl perbenzoate, tert-butyl perpivalate, tert-butyl peroxy-2-ethyl hexanoate, tert-butyl peroxy-2-ethyl hexanoate butyl permaleinate, cumene hydroperoxide, diisopropyl peroxidicarbamate, bis(o-toluoyl) peroxide, didecanoyl peroxide, dioctanoyl peroxide, dilauroyl peroxide, tert-butyl perisobutyrate, tert-butyl peracetate or di-tert-amyl peroxide. An example for hydroperoxide is tert-butyl hydroperoxide. Examples for azo compounds that decompose into radicals are azo-bis-isobutyronitrile, azo-bis-(2-amidonopropane) dihydrochloride or 2-2'-azo-bis-(2-methyl-butyronitrile). Examples for so-called redox catalysts are ascorbic acid/ferrous (II) sulfate/sodium peroxodisulfate, tert-butyl hydroperoxide/sodium disulfite, tert-butyl hydroperoxide/sodium hydroxy methane sulfinate or $H_2O_2$/CuI.

Polymerization is carried out, for example, in water or a mixture containing water as a solvent in a temperature range of 30 to 150° C., preferably 40 to 110° C., whereby work may be carried out under ambient pressure, reduced or increased pressure. For solution polymerization, a water-soluble polymerization initiator is selected, for example 2,2'-azobis(2-methylpropionamidine) dihydrochloride.

Polymerization regulators may be added to the reaction when polymerizing the monomers (i), (ii), (iii) and optionally (iv) to polymer V. Typically 0.001 to 5 mol % based on the total amount of all monomers (i), (ii), (iii) and (iv) are used. Polymerization regulators are well known in the literature and are, for example, sulfur compounds, sodium hypophosphite, formic acid or tribromochloromethane. Individual examples of sulfur compounds are mercaptoethanol, 2-ethylhexyl thioglycolate, thioglycolic acid and dodecyl mercaptan.

Preferably, polymer V has a weight-average molecular weight Mw between 75,000 and 5,000,000 dalton. Very preferably, polymer P has a weight-average molecular weight Mw between 100,000 and 4,500,000 dalton, particularly preferably between 180,000 and 2,500,000 dalton and particularly preferably between 210,000 and 1,500,000 dalton. The weight-average molecular weight may be determined by static light scattering, for example at a pH value of 9.0 in a 1000 millimolar saline solution.

Examples of monomers (i) of formula I are N-vinylformamide ($R^1$=H), N-vinylacetamide ($R^1$=$C_1$ alkyl), N-vinylpropionamide ($R^1$=$C_2$ alkyl) and N-vinylbutyramide ($R^1$=$C_3$ alkyl). The $C_3$-$C_6$ alkyls may be linear or branched. An example of $C_1$-$C_6$ alkyl is methyl, ethyl, n-propyl, 1-methylethyl, n-butyl, 2-methylpropyl, 3-methylpropyl, 1,1-dimethylethyl, n-pentyl, 2-methylbutyl, 3-methylbutyl, 2,2-dimethylpropyl or n-hexyl. $R^1$ is preferably H or $C_1$-$C_4$ alkyl, very preferably H or $C_1$-$C_2$ alkyl, very preferably H or $C_1$ alkyl, especially particularly preferably H, i.e. monomer (i) is N-vinylformamide. With one monomer of formula I being singular, herein also comprises a mixture of different monomers of formula I as monomer (i). Preferably the numerical proportion of the monomer with $R^1$=H in the total number of all monomers (i) of formula I is 85 to 100%, very preferably 90 to 100%, particularly preferably 95 to 100% and very particularly preferably 99 to 100%.

The total amount of all monomers (i) is preferably 33 to 65 mol % relative to all monomers polymerized to obtain polymer V, i.e. all monomers (i), (ii), (iii) and optionally (iv), very preferably 34 to 63 mol %, particularly preferably 35 to 61 mol % and most particularly 37 to 55 mol %. With a lower limit of 34 mol % for monomer (i), the upper limit for monomer (ii) is reduced to 55 mol % and the upper limit for monomer (iii) to 60 mol %. At a lower limit of 35 mol % and 37 mol % for monomer (i), the upper limit for monomer (ii) is reduced to 54 mol % and 52 mol %, and the upper limit for monomer (iii) is reduced to 59 mol % and 57 mol %, respectively. This principle of adjusting the upper limits of the other monomers in the event of an increase in the lower limit of a monomer is also applied mutatis mutandis to monomers (ii), (iii) and (iv) in order to satisfy the condition that the sum of all monomers (i), (ii), (iii) and optionally (iv) cannot exceed 100 mol %.

An ethylenically unsaturated monomer herein is a monomer containing at least one $C_2$ unit whose two carbon atoms are linked by a carbon-carbon double bond. In the case of hydrogen atoms as the only substituent, this is ethylene. In the case of substitution with 3 hydrogen atoms, a vinyl derivative is present. In the case of substitution with two hydrogen atoms, an E/Z isomer or an ethene-1,1-diylderivative is present. Mono-ethylenically unsaturated monomer means here that exactly one $C_2$ unit is present in the monomer.

In the case of a cationically charged group of a given molecule or class of molecules, salt form means that a corresponding anion ensures charge neutrality. Such anions are for example chloride, bromide, hydrogen sulfate, sulfate, hydrogen phosphate, methyl sulfate, acetate or formate. The preferred anions are chloride and hydrogen sulfate, especially chloride. In the case of an anionically charged group of a specified compound or compound class, salt form means that a corresponding cation ensures charge neutrality. Such cations are for example cations of the alkali metals, alkaline earth metals, ammonia, alkylamines or alkanolamines. Preferred are $Li^+$, $Na^+$, $K^+$, $Rb^+$, $Cs^+$, $Mg^{2+}$, $Ca^{2+}$, $Sr^{2+}$, $Ba^{2+}$ or $NH_4^+$. Very preferred are $Li^+$, $Na^+$, $K^+$, $Mg^{2+}$, $Ca^{2+}$ or $NH_4^+$, particularly preferred $Na^+$, $K^+$, $Ca^{2+}$ or $NH_4^+$, very particularly preferred $Na^+$, $K^+$ or $NH_4^+$, especially preferred $Na^+$ or $K^+$ and very especially preferred $Na^+$.

Monomer (ii) also comprises a mixture of individual monomers falling under monomer (ii).

Examples of a monomer (ii) which is a salt form of a monoethylenically unsaturated monomer having a quaternized nitrogen as the sole charge bearing group at a pH value of 7 are a salt form of an N-alkyl-N'-vinylimidazolium, a salt form of an N-alkylated vinylpyridinium, a salt form of an acrylamidoalkyl trialkylammonium or a salt form of a methacrylamidoalkyl trialkylammonium. For example, a salt form of an N-alkyl-N'-vinylimidazolium is 1-methyl-3-vinylimidazol-1-ium chloride, 1-methyl-3-vinylimidazol-1-ium methyl sulfate or 1-ethyl-3-vinylimidazol-1-ium chloride. For example, a salt form of an N-alkylated vinylpyridinium is 1-methyl-4-vinylpyridin-1-ium chloride, 1-methyl-3-vinylpyridin-1-ium chloride, 1-methyl-2-vinylpyridin-1-ium chloride or 1-ethyl-4-vinylpyridin-1-ium chloride. For example, a salt form of an acrylamidoalkyl trialkylammonium is acrylamidoethyl trimethylammonium chloride (trimethyl-[2-(prop-2-enoylamino)ethyl]ammonium chloride), acrylamidoethyl diethylmethylammonium chloride (diethyl methyl-[3-(prop-2-enoylamino)ethyl]ammonium chloride), acrylamidopropyl trimethylammonium chloride (trimethyl-[3-(prop-2-enoylamino)propyl]ammonium chloride) or acrylamidopropyl diethylmethylammonium chloride (diethyl methyl-[3-(prop-2-enoylamino)propyl]ammonium chloride). For example, a salt form of a methacrylic alkyl trialkylammonium is methacrylamidoethyl trimethylammonium chloride (trimethyl-[2-(2-methylprop-2-enoylamino)ethyl]ammonium chloride), methacrylamidoethyl diethylmethylammonium chloride (diethylmethyl-[3-(2-methylprop-2-enoylamino)ethyl]ammonium chloride), methacrylamidopropyl trimethylammonium chloride (trimethyl-[3-(2-methyl-prop-2-enoylamino)propyl] ammonium chloride) or methacrylamidopropyl diethylmethylammonium chloride (diethyl methyl-[3-(2-methylprop-2-enoylamino)propyl]ammonium chloride).

The salt form of a monoethylenically unsaturated monomer having a quaternized nitrogen as the sole charge-bearing group at pH value 7 has its quaternized nitrogen preferably obtained by reaction with a quaternizing agent, wherein the quaternizing agent is dimethyl sulfate, diethyl sulfate, methyl chloride, ethyl chloride or benzyl chloride. Methyl chloride is particularly preferred.

The monomer (ii) is preferably diallyl dimethylammonium chloride, diallyl diethylammonium chloride, a salt form of an N-alkyl-N'-vinylimidazolium, a salt form of an N-alkylated vinylpyridinium, a salt form of an acrylamido-alkyl trialkylammonium or a salt form of a methacrylami-doalkyl trialkylammonium. Very preferred is diallyl dimethylammonium chloride, diallyl diethylammonium chloride, a salt form of an N-alkyl-N'-vinylimidazolium, a salt form of an acrylamidoalkyl trialkylammonium or a salt form of a methacrylamidoalkyl trialkylammonium. Diallyl dimethyl-ammonium chloride, diallyl diethylammonium chloride, a salt form of an N-alkyl-N'-vinylimidazolium, acrylamido-ethyl trimethylammonium chloride or acrylamidopropyl trimethylammonium chloride are particularly preferred. Diallyl dimethylammonium chloride, diallyl diethylammo-nium chloride, acrylamidoethyl trimethylammonium chloride or acrylamidopropyl trimethylammonium chloride is particularly preferred. Diallyl dimethylammonium chloride is especially preferred.

The total amount of all monomers (ii) is preferably 6 to 45 mol % based on all monomers polymerized to obtain polymer V, i.e. all monomers (i), (ii), (iii) and optionally (iv), very preferably 8 to 42 mol % and particularly preferably 10 to 40 mol %, especially preferably 10 to 35 mol %. With a lower limit of 8 mol % or 10 mol % for monomer (ii), the upper limit for monomer (i) is reduced to 81 mol % or 79 mol % and the upper limit for monomer (iii) to 59 mol % or 57 mol %.

Monomer (iii) also comprises a mixture of individual monomers falling under monomer (iii).

Examples of a monomer (iii) which is a monoethylenically unsaturated carboxylic acid or its salt form are monoethylenically unsaturated $C_3$-$C_8$ mono- or dicarboxylic acids or their salt form. Examples are acrylic acid, sodium acrylate, methacrylic acid, sodium methacrylate, dimethacrylic acid, methacrylic acid, maleic acid, fumaric acid, itaconic acid, mesaconic acid, citraconic acid, methylene malonic acid, allylacetic acid, vinyl acetic acid or crotonic acid.

Examples of a monomer (iii) which is a monoethylenically unsaturated sulfonic acid or its salt form are vinyl sulfonic acid, acrylamido-2-methylpropane sulfonic acid, methacrylamido-2-methylpropane sulfonic acid, allylsulfonic acid, methallysulfonic acid, sulfoethyl acrylate, sulfoethyl methacrylate, sulfopropyl acrylate, sulfopropyl methacrylate, 2-hydroxy-3-methacryloxypropyl sulfonic acid or styrene sulfonic acid.

Examples of a monomer (iii) which is a monoethylenically unsaturated phosphonic acid or its salt form are vinylphosphonic acid, vinylphosphonic acid monomethyl ester, allylphosphonic acid, allylphosphonic acid monomethyl ester, acrylamidomethylpropyl phosphonic acid or acrylamidomethylene phosphonic acid.

Monomer (iii) is preferably a monoethylenically unsaturated $C_3$-$C_8$ mono- or dicarboxylic acid, a monoethylenically unsaturated sulfonic acid or vinylphosphonic acid or its salt form. Very preferably the monomer (iii) is a monoethylenically unsaturated $C_3$-$C_8$ mono- or dicarboxylic acid, acrylamido-2-methylpropanesulfonic acid, methacrylamido-2-methylpropanesulfonic acid or vinylphosphonic acid or their salt form. A monoethylenically unsaturated $C_3$-$C_8$ mono- or dicarboxylic acid or its salt form is particularly preferred. Acrylic acid, methacrylic acid, acrylamido-2-methylpropanesulfonic acid or vinylphosphonic acid or their salt form is particularly preferred. Especially preferred is acrylic acid or methacrylic acid or their salt form. Very especially preferred is acrylic acid, sodium acrylate, methacrylic acid or sodium methacrylate.

The total amount of all monomers (iii) is preferably 11 to 40 mol % based on all monomers polymerized to obtain polymer V, i.e. all monomers (i), (ii), (iii) and optionally (iv), very preferably 15 to 35 mol %, particularly preferably 18 to 33 mol % and most preferably 20 to 30 mol %. With a lower limit of 15 mol %, 18 mol % and 20 mol % for monomer (iii), the upper limit for monomer (i) is reduced to 79 mol %, 76 mol % and 74 mol % respectively and the upper limit for monomer (ii) to 52 mol %, 49 mol % and 47 mol % respectively.

Monomer (iv) also includes a mixture of individual monomers falling under monomer (iv).

The total amount of all monomers (iv) is preferably 0 to 30 mol % based on all monomers polymerized to obtain polymer V, i.e. all monomers (i), (ii), (iii) and optionally (iv), very preferably 0 to 20 mol %, particularly preferably 0.001 to 15 mol %, very particularly preferably 0.01 to 10 mol % and especially preferably 0.015 to 5 mol %.

Monomers (iv) are ethylenically unsaturated, different from monomers (i), (ii) and (iii) and preferably selected from (iv-1) a monoethylenically unsaturated monomer which carries no charge at pH value 7 or an ethylenically unsaturated monomer which carries no charge at pH value 7 and has exactly two ethylenic double bonds conjugated, (iv-2) a monoethylenically unsaturated monomer which carries at least one secondary or tertiary amino group and whose at least one secondary or tertiary amino group is protonated at pH value 7 but which does not carry a group which is deprotonated at pH value 7, or a diallyl-substituted amine which has exactly two ethylenic double bonds and is quaternized or protonated at pH value 7, or its salt form, (iv-3) 0 to 2 mol % of a monomer which has at least two ethylenically unsaturated double bonds which are not conjugated and which is different from a diallyl-substituted amine which has exactly two ethylenic double bonds, (iv-4) an ethylenically unsaturated monomer which is also different from monomers (iv-1), (iv-2) and (iv-3), wherein the total amount of all monomers (i), (ii), (iii) and (iv-1) to (iv-4) is 100 mol %, and mol % refers to the total amount of all monomers (i), (ii), (iii) and (iv-1) to (iv-4).

Monomer (iv-1) also comprises a mixture of individual monomers falling under monomer (iv-1).

Examples of the monomers (iv-1) are monoesters of $\alpha,\beta$-ethylenically unsaturated monocarboxylic acids with $C_1$-$C_{30}$ alkanols, monoesters of $\alpha,\beta$-ethylenically unsaturated monocarboxylic acids with $C_2$-$C_{30}$ alkanediols, diesters of $\alpha,\beta$-ethylenically unsaturated dicarboxylic acids with $C_1$-$C_{30}$ alkanols or $C_2$-$C_{30}$ alkanediols, primary amides of $\alpha,\beta$-ethylenically unsaturated monocarboxylic acids, N-alkylamides of $\alpha,\beta$-ethylenically unsaturated monocarboxylic acids, N,N-dialkylamides of $\alpha,\beta$-ethylenically unsaturated monocarboxylic acids, nitriles of $\alpha,\beta$-ethylenically unsaturated monocarboxylic acids, dinitriles of $\alpha,\beta$-ethylenically unsaturated dicarboxylic acids, esters of vinyl alcohol with $C_1$-$C_{30}$ monocarboxylic acids, esters of allyl alcohol with $C_1$-$C_{30}$ monocarboxylic acids, N-vinyl lactams, nitrogen-free heterocycles with an $\alpha,\beta$-ethylenically unsaturated double bond, vinyl aromatics, vinyl halides, vinylidene halides, $C_2$-$C_8$ monoolefins or $C_4$-$C_{10}$ olefins with exactly two double bonds that are conjugated.

Monoesters of $\alpha,\beta$-ethylenically unsaturated monocarboxylic acids with $C_1$-$C_{30}$ alkanols are for example methyl acrylate, methyl methacrylate, methyl ethacrylate (=methyl 2-ethyl acrylate), ethyl acrylate, ethyl methacrylate, ethyl ethacrylate (=ethyl 2-ethyl acrylate), n-butyl acrylate, n-butyl methacrylate, isobutyl acrylate, isobutyl methacrylate, tert-butyl acrylate, tert-butyl methacrylate, tert-butyl ethacrylate, n-octyl acrylate, n-octyl methacrylate, 1,1,3,3-tetramethyl butyl acrylate, 1,1,3,3-tetramethyl butyl methacrylate or 2-ethylhexyl acrylate.

Monoesters of α,β-ethylenically unsaturated monocarboxylic acids with $C_2$-$C_{30}$ alkanediols are for example 2-hydroxyethyl acrylate, 2-hydroxyethyl methacrylate, 2-hydroxyethyl ethacrylate, 2-hydroxypropyl acrylate, 2-hydroxypropyl methacrylate, 3-hydroxypropyl acrylate, 3-hydroxypropyl methacrylate, 3-hydroxybutylacrylate, 3-hydroxybutyl methacrylate, 4-hydroxybutylacrylate, 4-hydroxybutyl methacrylate, 6-hydroxyhexyl acrylate or 6-hydroxyhexyl methacrylate.

Primary amides of α,β-ethylenically unsaturated monocarboxylic acids are for example acrylic acid amide or methacrylic acid amide.

N-alkyl amides of α,β-ethylenically unsaturated monocarboxylic acids are for example N-methylacrylamide, N-methylmethacrylamide, N-isopropylacrylamide, N-isopropylmethacrylamide, N-ethyl acrylamide, N-ethyl methacrylamide, N-(n-propyl)acrylamide, N-(n-propyl)methacrylamide, N-(n-butyl)acrylamide, N-(n-butyl) methacrylamide, N-(tert-butyl)acrylamide, N-(tert-butyl) methacrylamide, N-(n-octyl)acrylamide, N-(n-octyl) methacrylamide, N-(1,1,3,3-tetramethylbutyl)acrylamide, N-(1,1,3,3-tetramethylbutyl)methacrylamide, N-(2-ethylhexyl)acrylamide or N-(2-ethylhexyl-methacrylamide.

N,N-dialkylamides from α,β-ethylenically unsaturated monocarboxylic acids are, for example, N,N-dimethylacrylamide or N,N-dimethylmethacrylamide.

Nitriles from α,β-ethylenically unsaturated monocarboxylic acids are, for example, acrylonitrile and methacrylonitrile.

Esters of vinyl alcohol with $C_1$-$C_{30}$ monocarboxylic acids are, for example, vinyl formate, vinyl acetate or vinyl propionate.

N-vinyl lactams are, for example, N-vinylpyrrolidone, N-vinylpiperidone, N-vinylcaprolactam, N-vinyl-5-methyl-2-pyrrolidone, N-vinyl-5-ethyl-2-pyrrolidone, N-vinyl-6-methyl-2-piperidone, N-vinyl-6-ethyl-2-piperidone, N-vinyl-7-methyl-2-caprolactam or N-vinyl-7-ethyl-2-caprolactam.

Vinylaromatics are, for example, styrene or methylstyrene. Vinyl halides are, for example, vinyl chloride or vinyl fluoride. Vinylidene halides are, for example, vinylidene chloride or vinylidene fluoride. $C_2$-$C_8$ monoolefins are, for example, ethylene, propylene, isobutylene, 1-butene, 1-hexene or 1-octene. $C_4$-$C_{10}$ olefins with exactly two double bonds that are conjugated are for example butadiene or isoprene.

Monomer (iv-1) is preferably acrylonitrile, methacrylonitrile, N-vinylpyrrolidone or vinyl acetate, very preferably acrylonitrile, N-vinylpyrrolidone or vinyl acetate.

The total amount of monomers (iv-1) is preferably 0 to 30 mol % based on all monomers polymerized to obtain Polymer V, i.e. all monomers (i), (ii), (iii), (iv-1), (iv-2), (iv-3) and (iv-4), very preferably 0 to 20 mol %, particularly preferably 0.001 to 15 mol %, very particularly preferably 0.01 to 10 mol % and especially preferably 0.015 to 5 mol %.

Monomer (iv-2) also comprises a mixture of individual monomers falling under monomer (iv-2). Examples of a monomer (iv-2) which is a monoethylenically unsaturated monomer which carries at least one secondary or tertiary amino group and whose at least one secondary or tertiary amino group is protonated at pH value 7, but which does not carry a group which is deprotonated at pH value 7 or its salt form, are esters of α,β-ethylenically unsaturated monocarboxylic acids with amino alcohols, mono- and diesters of α,β-ethylenically unsaturated dicarboxylic acids with amino alcohols, amides of α,β-ethylenically unsaturated monocarboxylic acids with dialkylated diamines, N-vinylimidazole or vinylpyridine.

The acid component of the esters of α,β-ethylenically unsaturated monocarboxylic acids with amino alcohols is preferably acrylic acid or methacrylic acid. The amino alcohols, preferably $C_2$-$C_{12}$ amino alcohols, may be $C_1$-$C_8$ mono- or $C_1$-$C_8$ dialkylated at the amine nitrogen. Examples are dialkylaminoethyl acrylates, dialkylaminoethyl methacrylates, dialkylaminopropyl acrylates or dialkylaminopropyl methacrylates. Individual examples are N-methylaminoethyl acrylate, N-methylaminoethyl methacrylate, N,N-dimethylaminoethyl acrylate, N,N-dimethylaminoethyl methacrylate, N,N-diethylaminoethyl acrylate, N,N-diethylaminoethyl methacrylate, N,N-dimethylaminopropyl acrylate, N,N-dimethylaminopropyl methacrylate, N,N-diethylaminopropyl acrylate, N,N-diethylaminopropyl methacrylate, N,N-dimethylaminocyclohexyl acrylate or N,N-dimethylaminocyclohexyl methacrylate.

In the mono- and diesters of α,β-ethylenically unsaturated dicarboxylic acids with amino alcohols, the acid component is preferably fumaric acid, maleic acid, monobutyl maleate, itaconic acid or crotonic acid. The amino alcohols, preferably $C_2$-$C_{12}$ amino alcohols, may be $C_1$-$C_8$ mono- or $C_1$-$C_8$ dialkylated at the amine nitrogen.

Amides of α,β-ethylenically unsaturated monocarboxylic acids with dialkylated diamines are for example dialkylaminoethylacrylamides, dialkylaminoethylmethacrylamides, dialkylaminopropylacrylamides or dialkylaminopropylacrylamides. Individual examples are N-[2-(dimethyl-amino) ethyl]acrylamide, N-[2-(dimethylamino)ethyl]methacrylamide, N-[3-(dimethylamino)propyl]acrylamide, N-[3-(dimethylamino)propyl]methacrylamide, N-[4-(dimethylamino)butyl]acrylamide, N-[4-(dimethylamino) butyl]methacrylamide, N-[2-(diethylamino)-ethyl] acrylamide or N-[2-(diethylamino)ethyl]methacrylamide Examples of a monomer (iv-2) which is a diallyl-substituted amine which has exactly two ethylenic double bonds and is quaternized or protonated at pH 7, or the salt form thereof are diallylamine, methyldiallylamine, diallyldipropylammonium chloride or diallyldibutylammonium chloride.

Monomer (iv-2) is preferably N-vinylimidazole.

The total amount of monomers (iv-2) is preferably 0 to 30 mol % based on all monomers polymerized to obtain polymer V, i.e. all monomers (i), (ii), (iii), (iv-1), (iv-2), (iv-3) and (iv-4), very preferably 0 to 20 mol %, particularly preferably 0.001 to 15 mol %, very particularly preferably 0.01 to 10 mol % and especially preferably 0.015 to 5 mol %.

Monomer (iv-3) also comprises a mixture of individual monomers falling under the monomer (iv-3).

Examples of the monomers (iv-3) are tetraallylammonium chloride, triallylamine, methylenebisacrylamide, glycol diacrylate, glycol dimethacrylate, glycerol triacrylate, Pentaerythritol triallyl ether, N,N-divinylethylene urea, tetraallylammonium chloride, polyalkylene glycols esterified at least twice with acrylic acid and/or methacrylic acid or polyols such as pentaerythritol, sorbitol and glucose.

Monomer (iv-3) is preferably tetraallylammonium chloride.

Monomer (iv-4) also includes a mixture of individual monomers falling under monomer (iv-3).

The monomers (iv-3) act as crosslinkers. A quantity employed is preferably 0.001 to 1 mol % based on all the monomers polymerized to obtain polymer V, i.e. all the monomers (i), (ii), (iii), (iv-1), (iv-2), (iv-3) and (iv-4), very preferably 0.01 to 0.5 mol % and especially preferably 0.015 to 0.1 mol %.

Examples for a monomer (iv-4) are the sulfobetaine 3-(dimethyl(methacryloylethyl)ammonium)propane sulfonate, the sulfobetaine 3-(2-methyl-5-vinylpyridine)propane sulfonate, the carboxy betaine N-3-methacrylamidopropyl-N,N-dimetyl-beta-ammonium propionate, the carboxy betaine N-2-acrylamidoethyl-N,N-dimethyl-beta-ammonium propionate, 3-vinylimidazole-N-oxide, 2-vinyl-pyridine-N-oxide or 4-vinyl-pyridine-N-oxide.

The total amount of monomers (iv-4) is preferably 0 to 30 mol % based on all monomers polymerized to obtain polymer V, i.e. all monomers (i), (ii), (iii), (iv-1), (iv-2), (iv-3) and (iv-4), very preferably 0 to 20 mol %, particularly preferably 0.001 to 15 mol %, very particularly preferably 0.01 to 10 mol % and especially preferably 0.015 to 5 mol %.

The monomer (iv) is preferably acrylonitrile, vinyl acetate, N-vinylpyrrolidone or N-vinylimidazole.

Preferably, polymer V has a weight-average molecular weight Mw between 10,000 and 10,000,000 dalton. Very preferably, polymer P has a weight-average molecular weight Mw between 20,000 and 5,000,000 dalton, particularly preferably between 100,000 and 4,500,000 dalton, very particularly preferably between 180,000 and 2,400,000 dalton and especially preferably between 210,000 and 1,500,000 dalton. The weight-average molecular weight may be determined with static light scattering, for example at a pH value of 9.0 in a 1000 millimolar saline solution.

A polymer V is preferred, which is available through radical polymerization of
(i) 33 to 83 mol % of a monomer of formula I

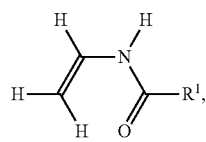

in which $R^1$=H or $C_1$-$C_6$ alkyl,
(ii) 6 to 56 mol % of diallyl dimethyl ammonium chloride, diallyl diethyl ammonium chloride, a salt form of an N-alkyl-N'-vinylimidazolium, a salt form of an N-alkylated vinylpyridinium, a salt form of an acrylamidoalkyl trialkylammonium or a salt form of a methacrylamidoalkyl trialkylammonium,
(iii) 11 to 61 mol % of a monoethylenically unsaturated carboxylic acid, a monoethylenically unsaturated sulfonic acid, or salt forms thereof,
(iv) 0 to 50 mol % of one or more ethylenically unsaturated monomers other than monomer (i), (ii) and (iii),
wherein the total amount of all monomers (i), (ii), (iii) and (iv) is 100 mol %.

A polymer V is preferred, which is available through radical polymerization of
(i) 33 to 83 mol % of a monomer of formula I

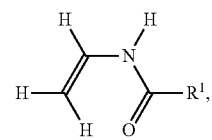

in which $R^1$=H,
(ii) 6 to 56 mol % of diallyl dimethyl ammonium chloride, a salt form of an N-alkyl-N'-vinylimidazolium, a salt form of an acrylamidoalkyl trialkylammonium or a salt form of a methacrylamidoalkyl trialkylammonium,
(iii) 11 to 61 mol % of acrylic acid, methacrylic acid, acrylamido-2-methylpropanesulfonic acid or their salt forms,
(iv) 0 to 50 mol % of one or more ethylenically unsaturated monomers other than monomer (i), (ii) and (iii),
wherein the total amount of all monomers (i), (ii), (iii) and (iv) is 100 mol %.

A polymer V is preferred, which is available through radical polymerization of
(i) 33 to 83 mol % of a monomer of formula I

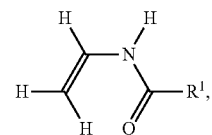

in which $R^1$=H,
(ii) 6 to 56 mol % of diallyl dimethyl ammonium chloride, a salt form of an N-alkyl-N'-vinylimidazolium, a salt form of an acrylamidoalkyl trialkylammonium or a salt form of a methacrylicamidoalkyl trialkylammonium,
(iii) 11 to 61 mol % of acrylic acid, methacrylic acid, acrylamido-2-methylpropanesulfonic acid or their salt forms,
(iv) 0 to 50 mol % of acrylonitrile, vinyl acetate, N-vinylpyrrolidone or N-vinylimidazole,
wherein the total amount of all monomers (i), (ii), (iii) and (iv) is 100 mol %.

A polymer V is preferred, which is available through radical polymerization of
(i) 33 to 83 mol % of a monomer of formula I

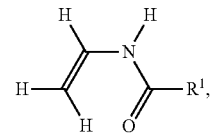

in which $R^1$=H,
(ii) 6 to 56 mol % of diallyl dimethyl ammonium chloride, a salt form of an N-alkyl-N'-vinylimidazolium or acrylamidopropyl trimethylammonium chloride, (iii) 11 to 61 mol % of acrylic acid, methacrylic acid, acrylamido-2-methylpropanesulfonic acid or their salt forms, (iv) 0 to 50 mol % of one or more ethylenically unsaturated monomers other than monomer (i), (ii) and (iii), wherein the total amount of all monomers (i), (ii), (iii) and (iv) is 100 mol %.

A polymer V is preferred, which is available through radical polymerization of (i) 33 to 83 mol % of a monomer of formula I

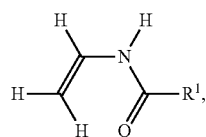

in which $R^1$=H, (ii) 6 to 56 mol % of diallyl dimethyl ammonium chloride, a salt form of an N-alkyl-N'-vinylimidazolium or acrylamidopropyl trimethylammonium chloride, (iii) 11 to 61 mol % of acrylic acid, methacrylic acid, acrylamido-2-methylpropanesulfonic acid or their salt forms, (iv) 0 to 50 mol % of acrylonitrile, vinyl acetate, N-vinylpyrrolidone or N-vinylimidazole, wherein the total amount of all monomers (i), (ii), (iii) and (iv) is 100 mol %.

A polymer V is preferred, which is available through radical polymerization of (i) 33 to 83 mol % of a monomer of formula I

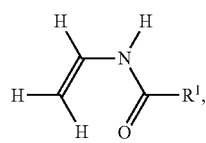

in which $R^1$=H, (ii) 6 to 56 mol % of diallyl dimethyl ammonium chloride, (iii) 11 to 61 mol % of acrylic acid or methacrylic acid or their salt form, (iv) 0 to 50 mol % of one or more ethylenically unsaturated monomers other than monomer (i), (ii) and (iii), wherein the total amount of all monomers (i), (ii), (iii) and (iv) is 100 mol %.

A polymer V is preferred, which is available through radical polymerization of (i) 33 to 83 mol % of a monomer of formula I

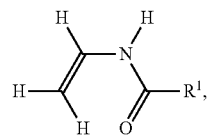

in which $R^1$=H, (ii) 6 to 35 mol % of diallyl dimethyl ammonium chloride, (iii) 11 to 61 mol % of acrylic acid or methacrylic acid or their salt form, (iv) 0 to 50 mol % of one or more ethylenically unsaturated monomers other than monomer (i), (ii) and (iii), wherein the total amount of all monomers (i), (ii), (iii) and (iv) is 100 mol %.

A polymer V is preferred, which is available through radical polymerization of (i) 33 to 55 mol % of a monomer of formula I

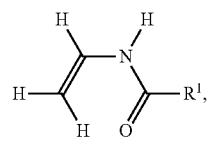

in which $R^1$=H, (ii) 10 to 40 mol % of diallyl dimethyl ammonium chloride, (iii) 11 to 40 mol % of acrylic acid or methacrylic acid or their salt form, wherein the total amount of all monomers (i), (ii) and (iii) is 100 mol %.

By polymerization of monomers of formula I, polymer V contains polymerized units with corresponding amide groups of formula I. In the case of N-vinylformamide, i.e. formula I where $R^1$=H, this is the formamide group NH C(=O)H.

Polymer P is formed by partial or complete hydrolysis of polymer V. As is known, e.g. in EP 0438744 A1, page 8/lines 26 to 34, the amide group can be hydrolyzed acidically or basically, splitting off the carboxylic acid and forming a primary amino group. A basic hydrolysis of the amide group is preferred. If not all amide groups are hydrolyzed, it is known that a cyclic, six-membered amidine may be formed by condensation of the primary amino group with an adjacent amide group. In this respect, the hydrolysis of an amide group leads to the formation of a primary amino group or an amidine group on polymer P according to the following reaction scheme.

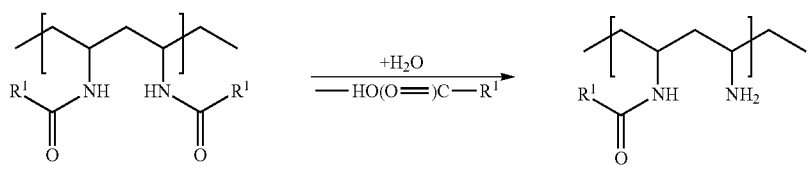

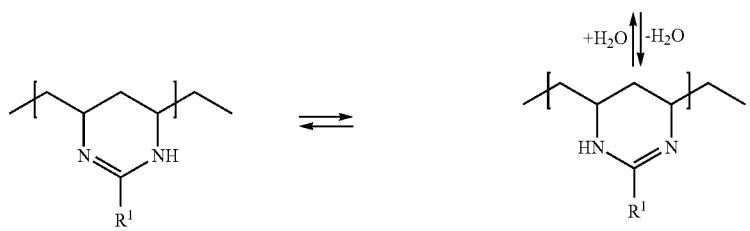

In the case of the polymerization of ethylene derivatives substituted directly on the ethylene function with cyano, e.g. acrylonitrile, polymer V additionally contains cyano groups. It is known that the primary amino group in polymer P formed by hydrolysis may react with one of these cyano groups to form a cyclic, 5-membered amidine. In this case, the hydrolysis of an amide group leads to an amidine group on polymer P according to the following reaction scheme. In the following reaction scheme, the cyano-substituted ethylene derivative is polymerized acrylonitrile.

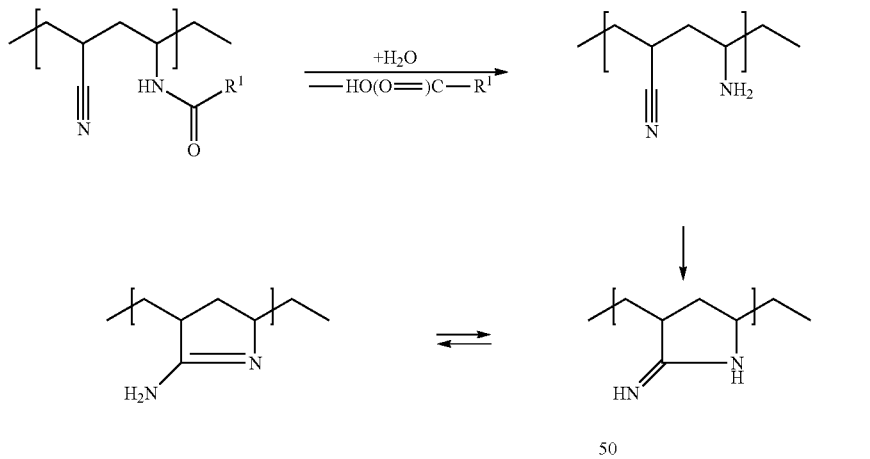

In both cases shown, the hydrolysis of an amide group derived from a monomer of formula I results in a primary amino group or an amidine group. A primary amino group or an amidine group is positively charged at pH=7 and corresponds to a cationic charge in polymer P.

The conditions for hydrolysis of the amide groups in polymer P, which originate from monomers of formula I, may also lead to hydrolysis of other groups in polymer V which are sensitive to hydrolysis under these conditions. It is known, for example, that in EP 0216387 A2, column 6/lines 7 to 43, or in WO 2016/001016 A1, page 17/lines 1 to 8, acetate groups in polymer V which are derived from vinyl acetate as copolymerized monomer (iv-1) hydrolyze. Accordingly, a secondary hydroxy group is formed in polymer P as shown below.

-continued

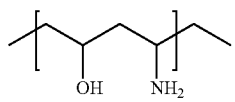

The number of units of the monomers of the formula (I) polymerized into polymer V, which are hydrolyzed in polymer P, may be determined experimentally by quantitative detection of the carboxylic acids $HOC(=O)R^1$ split off from the groups $N-C(=O)R^1$. The number of hydrolyzed $N-C(=O)R^1$ groups from the polymerized units of the formula I relative to all polymerized units of the formula I multiplied by 100% gives the degree of hydrolysis.

Preference is given to at least 87% to 100% of the $N-C(=O)R1$ groups of the units of the monomers of the formula (I) polymerized in polymer V, hydrolyzed relative to the number of all units of the monomers of the formula I polymerized in polymer V. Very preferred is 88% to 100%, particularly preferred 90% to 99%, very particularly preferred 93% to 98% and especially preferred 94% to 97%.

Preference is given to the polymer P amphoteric-cationic. Polymer P is amphoteric because it has polymer units with a functional group which carries a positive charge at least at pH value 7, e.g. polymerized monomers (ii) and hydrolyzed polymerized monomers (i), and polymer units with a functional group which carries a negative charge at least at pH value 7, e.g. polymerized monomers (iii). If the number of all functional groups with positive charges is higher than the number of all functional groups with negative charges, and the number of positive charges differs from that of negative charges by equal or more than 7 mol % units, 100 mol % units being the number of all polymerized monomers for the preparation of polymer V, then polymer P is amphoteric-cationic. For example, a polymer P is amphoteric-cationic in which 50 mol % of N-vinylformamide, 7 mol % of DADMAC and 43 mol % sodium acrylate are polymerized and the degree of hydrolysis of the polymerized N-vinylformamide units is 90%. The number of positive charges is 52 mol %, the number of negative charges is 43 mol % and the difference is 9 mol %. A polymer P is very preferably amphoteric-cationic and the number of positive charges in mol % less the number of negative charges in mol % based on the total number of polymerized monomers of polymer V is between 20 mol % and 89 mol %. Particularly preferred is 30 mol % to 70 mol % and especially preferred is 35 mol % to 60 mol %.

Preferably polymer P has a weight-average molecular weight Mw between 8,000 and 8,000,000 dalton. Very preferably, polymer P has a weight-average molecular weight Mw between 16,000 and 4,000,000 daltons, particularly preferably between 80,000 and 3,600,000 daltons, very particularly preferably between 150,000 and 2,000,000 daltons and especially preferably between 170,000 and 1,200,000 daltons. The weight-average molecular weight may be determined with static light scattering, for example at a pH value of 9.0 in a 1000 millimolar saline solution.

A polymer P is preferred, which is available through radical polymerization to a polymer V of
(i) 33 to 83 mol % of a monomer of formula I

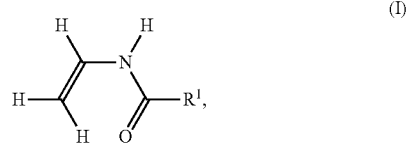

in which $R^1$=H or $C_1$-$C_6$ alkyl,
(ii) 6 to 56 mol % of diallyl dimethyl ammonium chloride, diallyl diethyl ammonium chloride, a salt form of an N-alkyl-N'-vinylimidazolium, a salt form of an N-alkylated vinylpyridinium, a salt form of an acrylamidoalkyl trialkylammonium or a salt form of a methacrylamidoalkyl trialkylammonium,
(iii) 11 to 61 mol % of a monoethylenically unsaturated carboxylic acid, a monoethylenically unsaturated sulfonic acid, or its salt forms,
(iv) 0 to 50 mol % of one or more ethylenically unsaturated monomers other than monomer (i), (ii) and (iii), wherein the total amount of all monomers (i), (ii), (iii) and (iv) is 100 mol %, and hydrolyzing the N—C(=O)$R^1$ groups of the units of the monomers of formula (I) polymerized into polymer V to form primary amino or amidine groups to polymer P, wherein at least 87% of the units of the monomers of formula (I) polymerized into polymer V are hydrolyzed, based on the number of all units of the monomers of formula I polymerized into polymer V.

A polymer P is preferred, which is available through radical polymerization to a polymer V of
(i) 33 to 83 mol % of a monomer of formula I

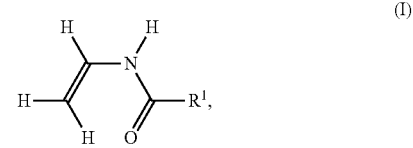

in which $R^1$=H,
(ii) 6 to 56 mol % of diallyl dimethyl ammonium chloride, a salt form of an N-alkyl-N'-vinylimidazolium, a salt form of an acrylamidoalkyl trialkylammonium or a salt form of a methacrylamidoalkyl trialkylammonium,
(iii) 11 to 61 mol % of acrylic acid, methacrylic acid, acrylamido-2-methylpropanesulfonic acid or their salts,
(iv) 0 to 50 mol % of one or more ethylenically unsaturated monomers other than monomer (i), (ii) and (iii), wherein the total amount of all monomers (i), (ii), (iii) and (iv) is 100 mol %, and hydrolyzing the N—C(=O)$R^1$ groups of the units of the monomers of formula (I) polymerized into polymer V to form primary amino or amidine groups to polymer P, wherein at least 87% of the units of the monomers of formula (I) polymerized into polymer V are hydrolyzed, based on the number of all units of the monomers of formula I polymerized into polymer V.

A polymer P is preferred, which is available through radical polymerization to a polymer V of
(i) 33 to 83 mol % of a monomer of formula I

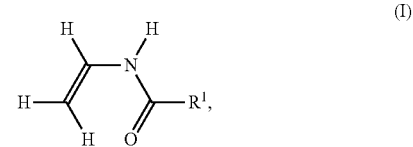

in which $R^1$=H,
(ii) 6 to 56 mol % of diallyl dimethyl ammonium chloride, a salt form of an N-alkyl-N'-vinylimidazolium, a salt form of an acrylamidoalkyl trialkylammonium or a salt form of a methacrylamidoalkyl trialkylammonium,
(iii) 11 to 61 mol % of acrylic acid, methacrylic acid, acrylamido-2-methylpropanesulfonic acid or their salt forms,
(iv) 0 to 50 mol % of acrylonitrile, vinyl acetate, N-vinylpyrrolidone or N-vinylimidazole, wherein the total amount of all monomers (i), (ii), (iii) and (iv) is 100 mol %, and hydrolyzing the N—C(=O)R$^1$ groups of the units of the monomers of formula (I) polymerized into polymer V to form primary amino or amidine groups to polymer P, wherein at least 87% of the units of the monomers of formula (I) polymerized into polymer V are hydrolyzed, based on the number of all units of the monomers of formula I polymerized into polymer V.

A polymer P is preferred, which is available through radical polymerization to a polymer V of
(i) 33 to 83 mol % of a monomer of formula I

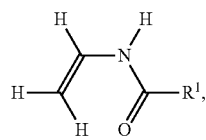

in which R$^1$=H,
(ii) 6 to 56 mol % of diallyl dimethyl ammonium chloride, a salt form of an N-alkyl-N'-vinylimidazolium or acrylamidopropyl trimethylammonium chloride,
(iii) 11 to 61 mol % of acrylic acid, methacrylic acid, acrylamido-2-methylpropanesulfonic acid or their salts,
(iv) 0 to 50 mol % of one or more ethylenically unsaturated monomers other than monomer (i), (ii) and (iii),
wherein the total amount of all monomers (i), (ii), (iii) and (iv) is 100 mol %, and hydrolyzing the N—C(=O)R$^1$ groups of the units of the monomers of formula (I) polymerized into polymer V to form primary amino or amidine groups to polymer P, wherein at least 87% of the units of the monomers of formula (I) polymerized into polymer V are hydrolyzed, based on the number of all units of the monomers of formula I polymerized into polymer V.

A polymer P is preferred, which is available through radical polymerization to a polymer V of
(i) 33 to 83 mol % of a monomer of formula I

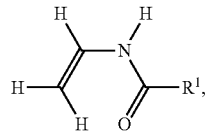

in which R$^1$=H,
(ii) 6 to 56 mol % of diallyl dimethyl ammonium chloride, a salt form of an N-alkyl-N'-vinylimidazolium or acrylamidopropyl trimethylammonium chloride,
(iii) 11 to 61 mol % of acrylic acid, methacrylic acid, acrylamido-2-methylpropanesulfonic acid or their salt forms,
(iv) 0 to 50 mol % of acrylonitrile, vinyl acetate, N-vinylpyrrolidone or N-vinylimidazole,
wherein the total amount of all monomers (i), (ii), (iii) and (iv) is 100 mol %, and hydrolyzing the N—C(=O)R$^1$ groups of the units of the monomers of formula (I) polymerized into polymer V to form primary amino or amidine groups to polymer P, wherein at least 87% of the units of the monomers of formula (I) polymerized into polymer V are hydrolyzed, based on the number of all units of the monomers of formula I polymerized into polymer V.

A polymer P is preferred, which is available through radical polymerization to a polymer V of
(i) 33 to 83 mol % of a monomer of formula I

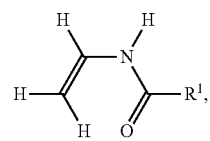

in which R$^1$=H,
(ii) 6 to 56 mol % of diallyl dimethyl ammonium chloride,
(iii) 11 to 61 mol % of acrylic acid or methacrylic acid or its salt form,
(iv) 0 to 50 mol % of one or more ethylenically unsaturated monomers other than monomer (i), (ii) and (iii),
wherein the total amount of all monomers (i), (ii), (iii) and (iv) is 100 mol %, and hydrolyzing the N—C(=O)R$^1$ groups of the units of the monomers of formula (I) polymerized into polymer V to form primary amino or amidine groups to polymer P, wherein at least 87% of the units of the monomers of formula (I) polymerized into polymer V are hydrolyzed, based on the number of all units of the monomers of formula I polymerized into polymer V.

A polymer P is preferred, which is available through radical polymerization to a polymer V of
(i) 33 to 83 mol % of a monomer of formula I

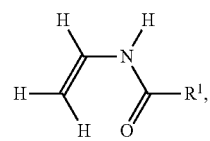

in which R$^1$=H,
(ii) 6 to 35 mol % of diallyl dimethyl ammonium chloride,
(iii) 11 to 61 mol % acrylic acid or methacrylic acid or their salt form,
(iv) 0 to 50 mol % of one or more ethylenically unsaturated monomers other than monomer (i), (ii) and (iii),
wherein the total amount of all monomers (i), (ii), (iii) and (iv) is 100 mol %, and hydrolyzing the N—C(=O)R$^1$ groups of the units of the monomers of formula (I) polymerized into polymer V to form primary amino or amidine groups to polymer P, wherein at least 87% of the units of the monomers of formula (I) polymerized into polymer V are hydrolyzed, based on the number of all units of the monomers of formula I polymerized into polymer V.

A polymer P is preferred, which is available through radical polymerization to a polymer V of
(i) 33 to 55 mol % of a monomer of formula I

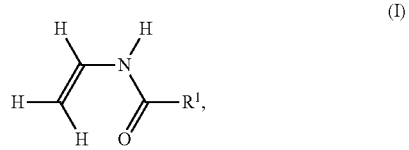

in which $R^1$=H,
(ii) 10 to 40 mol % of diallyl dimethyl ammonium chloride,
(iii) 11 to 40 mol % of acrylic acid or methacrylic acid or their salt form,
wherein the total amount of all monomers (i), (ii) and (iii) is 100 mol %, and
hydrolyzing the N—C(=O)$R^1$ groups of the units of the monomers of formula (I) polymerized into polymer V to form primary amino or amidine groups to polymer P, wherein at least 87% of the units of the monomers of formula (I) polymerized into polymer V are hydrolyzed, based on the number of all units of the monomers of formula I polymerized into polymer V.

The second aqueous pulp suspension containing polymer P comprises
(a-a) water
(a-b) pulp
(a-c) polymer P.

A possible further component of the second aqueous pulp suspension is (a-d) an organic polymer other than a pulp and polymer P. The organic polymer (a-d) may be neutral, cationic or anionic.

A neutral organic polymer (a-d) may be uncharged neutral because it does not contain polymer units with a functional group that carries a charge at least at pH value 7. A functional group which carries a charge at least at pH value 7 is herein understood to be an atom or a linked group of atoms covalently bonded to the remainder of the polymer unit. The functional group permanently carries a charge or acts on its own, i.e. independently of other components of the polymer unit or other polymer units, in its uncharged form in pure water as an acid or as a base. The acid effect leads to the formation of a negative charge on the corresponding functional group of the polymer unit when deprotonated with a base. This may be done, for example, with NaOH, KOH or $NH_3$, which are typically used in aqueous solution, and lead to the corresponding sodium, potassium or ammonium salts. The base effect leads to the formation of a positive charge on the corresponding functional group of the polymer unit when protonated with an acid. This may be done, for example, with HCl, $H_2SO_4$, $H_3PO_4$, HCOOH or $H_3CCOOH$, which are typically used in aqueous solution, and lead to the corresponding chloride, hydrogen sulfate/sulfate, dihydrogen phosphate/hydrogen phosphate/phosphate, formate or acetate salts. An example of a functional group with a permanent positive charge is —$(CH_2)_4$ $N^+$ (a tetraalkylated nitrogen) such as that in diallyl dimethyl ammonium or in 2-(N,N,N-trimethylammonium)ethylacrylate. Examples of a functional group that leads to the formation of negative charges in the polymer unit are —COOH (a carboxylic acid), —$SO_2OH$ (a sulfonic acid), $PO(OH)_2$ (a phosphonic acid), —O—$SO_2OH$ (a monoesterified sulfuric acid) or —O—$PO(OH)_2$ (a monoesterified phosphoric acid). Examples of a functional group which lead to the formation of positive charges in the polymer unit are —$CH_2$—$CH(NH_2)$— or —$CH_2$—$NH_2$ (a primary and basic amino group), (—$CH_2$—$)_2NH$ (a secondary and basic amino group), (—$CH_2$—$)_3N$ (a tertiary and basic amino group) or $(-)_2CH$—N=CH—NH—CH$(-)_2$ (a basic amidine group, in particular also in the form of a cyclic amidine).

Examples of a neutral organic polymer (a-d) not containing polymer units with a functional group carrying a charge at least at pH value 7 are polyacrylamide, poly(acrylamide-co-acrylonitrile), poly(vinyl alcohol) or poly(vinyl alcohol-co-vinyl acetate).

A neutral organic polymer (a-d) may also be amphoteric-neutral because it contains polymer units with a functional group carrying a negative charge at least at a pH value of 7, and polymer units with a functional group carrying a positive charge at least at a pH value of 7, and further the number of all negative charges and the number of all positive charges of the functional groups balance each other. An organic polymer in which the number of positive charges differs from the number of negative charges by less than 7 mol % units is also considered to be amphoterically-neutral therein, wherein 100 mol % units is the number of all polymerized monomers used to produce the organic polymer. For example, an organic polymer formed by polymerization of 30 mol % acrylic acid and 70 mol % N-vinylformamide, and in which further half of the polymerized N-vinylforamide units are hydrolyzed, with 5 mol % units difference between the functional groups —COOH and —$CH_2$—$CH(NH_2)$— is considered amphoterically neutral. In the case of the polymerization of 10 mol % itaconic acid (HOOC—$CH_2$—C(=$CH_2$)—COOH), 10 mol % acrylic acid and 80 mol % N-vinylformamide to an organic polymer in which 44% of the polymerized N-vinylformamide units are then hydrolyzed, the polymer is considered amphoterically neutral at 5 mol % units difference between the functional groups COOH and —CH2-CH(NH2)-.

A cationic organic polymer (a-d) may be purely cationic, i.e. it contains polymer units with a functional group which carries a positive charge at least at a pH value of 7, but it does not contain polymer units with a functional group which carries a negative charge at least at a pH value of 7. Examples of a pure cationic organic polymer (a-d) are poly(allylamine), poly(diallylamine), poly(diallyl-dimethyl-ammonium chloride), poly(acrylamide-co-diallyl dimethyl ammonium chloride) or poly(acrylamide-co-2-(N,N,N-trimethylammonium)ethyl acrylate chloride).

A cationic organic polymer (a-d) may also be amphoteric-cationic, i.e. it contains polymer units with a functional group which carries a positive charge at least at a pH value of 7, and polymer units with a functional group which carries a negative charge at least at a pH value of 7, and the number of all positive charges is higher than the number of all negative charges of the functional groups. An amphoteric-cationic is herein considered to be an organic polymer in which the number of positive charges differs from that of negative charges by equal to or more than 7 mol % units, 100 mol % units being the number of all polymerized monomers used to produce the organic polymer. For example, an organic polymer formed by polymerization of 30 mol % of acrylic acid and 70 mol % of N-vinylformamide, and in which further 57% of the polymerized N-vinylforamide units are hydrolyzed, with 10 mol % units difference between the functional groups —COOH and —$CH_2$—CH$(NH_2)$— is considered amphoteric-cationic.

An anionic organic polymer (a-d) may be pure anionic, i.e. it contains polymer units with a functional group which carries a negative charge at least at a pH value of 7, but it does not contain polymer units with a functional group which carries a positive charge at least at a pH value of 7. Examples of a pure anionic organic polymer (a-d) are poly(acrylic acid), poly(styrene-co-n-butylacrylate-co-acrylic acid) or poly(acrylamide-co-acrylonitrile-co-acrylic acid).

An anionic organic polymer (a-d) may also be ampho-teric-anionic, i.e. it contains polymer units with a functional group which carries a negative charge at least at a pH value of 7, and polymer units with a functional group which carries a positive charge at least at a pH value of 7, and the number of all negative charges is higher than the number of all positive charges of the functional groups. An amphoteric-anionic is herein considered to be an organic polymer in which the number of negative charges differs from that of positive charges by equal to or more than 7 mol % units, 100 mol % units being the number of all polymerized monomers used to produce the organic polymer. For example, an organic polymer formed by polymerizing 30 mol % of acrylic acid and 70 mol % of N-vinylformamide, and in which further 29% of the polymerized N-vinylforamide units are hydrolyzed, with 10 mol % units difference between the functional groups —COOH and —$CH_2$—CH ($NH_2$)— is considered amphoteric-anionic.

The organic polymer (a-d) may also be classified as linear, branched or crosslinked. Crosslinking may be achieved, for example, by adding a crosslinking agent during the polymerization of the starting monomers or by adding a crosslinking agent after the polymerization is complete, especially just before the organic polymer (a-d) is added to the second aqueous pulp suspension. For example, polyacrylamide can already be crosslinked during the polymerization by adding the crosslinker methylenebisacrylamide to acrylamide or by adding a crosslinker such as glyoxal only after the polymerization. If necessary, both types of crosslinking may also be combined. A crosslinked organic polymer should be mentioned in particular, which shows a high degree of crosslinking, typically already during monomer polymerization. It is present in the second aqueous pulp suspension containing polymer P as particles, especially as so-called organic microparticles.

The organic polymer (a-d) may also be classified as natural, modified-natural or synthetic. A natural organic polymer is usually derived from nature, with appropriate isolation steps being applied where necessary, but no specific chemical-synthetic modification. An example of a natural organic polymer (a-d) is unmodified starch. No example of a natural organic polymer (a-d) is cellulose—which is herein a pulp (a-b). A modified natural organic polymer is modified by a chemical synthetic process step. An example of a modified natural organic polymer (a-d) is cationic starch. A synthetic organic polymer (a-d) is obtained chemically-synthetically from individual monomers. An example of a synthetic organic polymer (a-d) is polyacrylamide.

A method is preferred in which in step (A) an organic polymer (a-d) is added to the first pulp suspension or the second pulp suspension containing polymer P. Very preferably an organic polymer (a-d), which is a modified natural organic polymer, is added. The organic polymer (a-d) cationic starch is particularly preferred. Most preferably, cationic starch is the only organic polymer (a-d) which is added in step (A) to the first pulp suspension in addition to polymer P or to the second pulp suspension containing polymer P.

A possible further component of an aqueous pulp suspension containing polymer P is (a-e) a filler. A filler (a-e) is an inorganic particle, in particular an inorganic pigment. Possible inorganic pigments are all pigments based on metal oxides, silicates and/or carbonates which are normally used in the paper industry, in particular pigments from the group comprising calcium carbonate which may be used in the form of ground lime, chalk, marble (GCC) or precipitated calcium carbonate (PCC), talc, kaolin, bentonite, satin white, calcium sulfate, barium sulfate and titanium dioxide. An inorganic particle is also a colloidal solution of polysilicic acids in which the silica particles typically have a particle size between 5 and 150 nm.

A filler (a-e) in this case also includes two or more different fillers. Accordingly, filler (a-e) as a possible further component of an aqueous pulp suspension is divided into a first filler (a-e-1), a second filler (a-e-2) . . . etc.

Preferably inorganic pigments with a mean particle size (volume-mean)≤0 μm, preferably from 0.3 to 5 μm, in particular up to 0.5 to 2 μm are used. The determination of the average particle size (volume-average) of the inorganic pigments as well as the particles of the powder composition is generally carried out within the scope of this paper by the quasi-elastic light scattering method (DIN-ISO 13320-1), for example with a Mastersizer 2000 from Malvern Instruments Ltd.

A method is preferred in which a filler (a-e) is added to the first pulp suspension or to the second pulp suspension containing polymer P in step (A).

The total amount of filler (a-e) is preferably 0 to 40% by weight based on the resulting paper or cardboard and based on a dry content of 100% by weight of the filler (a-e) and a dry content of the paper or cardboard of 100% by weight. Very preferably the total amount of filler (a-e) is 5 to 30% by weight, particularly preferably 15 to 25% by weight and very particularly preferably 15 to 20% by weight.

Preferably, the resulting paper or cardboard contains a total amount of filler (a-e) of 5% by weight to 30% by weight. Such papers are for example wood-free papers. Preferably, the resulting paper or cardboard contains a total amount of filler (a-e) of 5% by weight to 20% by weight. Such papers are mainly used as packaging papers. The resulting paper or cardboard preferably contains a total amount of filler (a-e) of 5% by weight to 15% by weight. Such papers are mainly used for newspaper printing. The resulting paper or cardboard preferably contains a total amount of filler (a-e) of 25% by weight to 40% by weight. Such papers are for example SC (super calandered) papers.

In step (A), polymer P is added to the first aqueous pulp suspension, preferably before a filler (a-e) is added. It is very preferable to add the polymer P before a filler (a-e) and before an organic polymer (a-d) with the exception of cationic starch being added. It is particularly preferred to add polymer P before a filler (a-e), before an organic polymer (a-d) other than cationic starch and before any other paper auxiliary (a-f) is added to the first aqueous pulp suspension.

In step (A), a filler (a-e) is added, if necessary, preferably to the second pulp suspension containing polymer P, which has a dry content of 0.1% by weight to 1.5% by weight. This addition corresponds to the so-called thin stock addition. The second pulp suspension containing polymer P is either already present with this dry content or has previously been diluted to a dry content of 0.1% by weight by weight to 1.5% by weight starting from a dry content of more than 0.15% by weight to 6.0% by weight.

In step (A), a filler (a-e) is added, if desired, preferably to the second pulp suspension containing polymer P, a first part of the total amount of filler (a-e) to be added being added to the pulp suspension containing polymer P, which has a dry content of more than 0.15% by weight up to 6.0% by weight, and a second part of the total amount of filler (a-e) to be added is added to the pulp suspension containing polymer P after dilution to a dry content of 0.1% by weight up to 1.5% by weight. The first part and the second part form the total amount of filler (a-e) to be added. The weight ratio of the first part to the second part is between 5 and 0.2.

A possible further component of an aqueous pulp suspension containing polymer P is (a-f) another paper additive. Another paper auxiliary (a-f) is different from the aforementioned components (a-b), polymer P as (a-c), (a-d) and (a-e). Another paper auxiliary (a-f) is for example a bulk sizing agent, a water-soluble salt of a trivalent metal cation, a defoamer, a non-polymer wet strength agent, a biocide, an optical brightener or a paper dye. Examples of a bulk sizing agent are alkyl chain dimers (AKD), alkenyl succinic anhydrides (ASA) and resin size. Examples of a water-soluble salt of a trivalent metal cation are aluminum(III) salts, especially $AlCl_3$ such as $AlCl_3 \cdot 6\ H_2O$, $Al_2(SO_4)_3$ such as $Al_2(SO_4)_3 \cdot 18\ H_2O$, or $KAl(SO_4)_2 \cdot 12\ H_2O$. The other paper auxiliaries (a-f) may preferably be used in the usual quantities.

Preferably, another paper auxiliary (a-f) is added to the second pulp suspension containing polymer P, which has a dry content of 0.1% by weight to 1.5% by weight. This addition corresponds to the so-called thin stock addition. The second pulp suspension containing polymer P is already present with this dry content or has previously been diluted to a dry content of 0.1% by weight to 1.5% by weight starting from a dry content of more than 0.15% by weight up to 6.0% by weight.

Another paper auxiliary (a-f) herein also includes two or more different other paper auxiliaries. Accordingly, other paper auxiliary (a-f) as a possible further component of a second aqueous pulp suspension containing polymer P is divided into a first other paper auxiliary (a-f-1), a second other paper auxiliary (a-f-2) . . . etc.

More than one organic polymer (a-d) and more than one filler (a-e) are often added to an aqueous pulp suspension during paper making. In the case of an organic polymer (a-d), for example, this is used to influence technical properties of the paper-making-method itself or technical properties of the paper produced. Retention agents, dehydrating agents, wet strength agents or other dry strength agents are used.

Examples of retention agents are cationic, amphoteric or anionic organic polymers (a-d). Examples are an anionic polyacrylamide, a cationic polyacrylamide, a cationic starch, a cationic polyethyleneimine or a cationic polyvinylamine. A retention agent is for example a filler (a-e) which is an anionic microparticle, in particular colloidal silica or bentonite. Combinations of the above examples are also possible. One combination in particular is a dual system consisting of a cationic polymer with an anionic microparticle or an anionic polymer with a cationic microparticle. The preferred retention agent is a synthetic organic polymer (a-d) or a dual system. In the case of a dual system as retention agent, for example, a cationic first organic polymer (a-d-1) is already present in combination with a first filler (a-e-1), for example a suitable bentonite, and a second filler (a-e-2) is then calcium carbonate.

Examples of another dry strength agent are a synthetic organic polymer (a-d) such as polyvinylamine, polyethyleneimine, polyacrylamide or glyoxylated polyacrylamide, a natural organic polymer (a-d) such as unmodified starch or a modified natural organic polymer (a-d) such as a cationically modified starch or an oxidatively or enzymatically degraded starch. The addition of another dry strength agent is preferably made to the first aqueous pulp suspension or to the second aqueous pulp suspension containing polymer P, both of which have a dry content of more than 1.5% by weight to 6.0% by weight. An addition to the first aqueous pulp suspension or the second aqueous pulp suspension containing polymer P, both of which have a dry content of 0.1% by weight up to 1.5% by weight, is possible.

The second aqueous pulp suspension containing polymer P is preferably free of a so-called microparticle or microparticle. A microparticle is organic or inorganic. An organic microparticle is an organic polymer which has a limited solubility in water and can be crosslinked. Preferably, the organic microparticle is insoluble in water, although it very preferably has a swelling capability in water. Unswollen organic microparticles have an average particle diameter of ≤750 nm, preferably ≤500 nm, especially in the range of 25 to 300 nm particle size. The polymerization to an organic microparticle is usually effected by inverse emulsion polymerization or inverse microemulsion polymerization and is generally known to the expert. Such polymerizations are described, for example, in US 2003/0192664 (page 6), whose teaching is expressly referred to. The microparticles are usually prepared by (a) preparing a W/O emulsion with an oil phase as the continuous phase and an aqueous discontinuous phase by emulsifying an aqueous solution of the monomers in a hydrocarbon in the presence of a surfactant, and (b) carrying out a free radical polymerization. Preferably used are anionic organic microparticles, in particular copolymers of acrylamide and one or several anionic monomers. Inorganic microparticles, in contrast to inorganic fillers, which have a specific surface according to BET of ≤20 $m^2$/g, have a specific surface according to BET of ≥100 $m^2$/g (BET measurement according to DIN ISO 9277:2003-05). Inorganic microparticles are preferably bentonite, colloidal silica, silicates and/or calcium carbonate with a BET-Wet of ≥100 $m^2$/g. Inorganic microparticles are preferably bentonite, colloidal silica, silicates and/or calcium carbonate with a BET-Wet of ≥100 $m^2$/g. Bentonite is generally understood to be phyllosilicates that are swellable in water. These are mainly the clay mineral montmorrillonite and similar clay minerals such as nontronite, hectorite, saponite, sauconite, beidellite, allevardite, illite, halloysite, attapulgite and sepiolite. These phyllosilicates are preferably activated prior to use, i.e. converted into a water-swellable form, by treating the phyllosilicates with an aqueous base such as aqueous solutions of caustic soda, caustic potash, soda or potash ash. These have a specific surface area of 200-1000 $m^2$/g and an average particle size distribution of 1-250 nm, normally in the range 40-100 nm. The possibility to dispense with microparticles may be an advantage of the method according to the invention.

In step (B), the second aqueous pulp suspension containing polymer P is applied to the water-permeable substrate. The water-permeable substrate has a top and a bottom side and fine openings, which allow water to pass through but essentially do not allow fibrous components to pass through. The upper surface of the water-permeable substrate is a substantially flat surface at the moment of application, i.e. apart from the fine openings or other material-related irregularities and a certain possible radius of curvature. This allows the production of a uniformly thin, as homogeneous as possible wet pulp web or a wet paper structure or wet paper sheet. After application of the second aqueous pulp suspension containing polymer P, parts of the water (a-a) run off through the fine openings, whereupon sheet formation occurs on the top side, thus creating the wet paper structure. A wet paper structure produced in this way is flat, i.e. it has a very small height in relation to its length and width. The pulp of the second pulp suspension containing polymer P as well as possible other components that are to be present in the finally produced paper or cardboard, for example a filler (a-e), are ideally retained entirely or at least substantially in the wet paper structure that forms. Possible further components of the second aqueous pulp suspension containing polymer P, which are added to assist the retention of the other components, to assist the dehydrate or to assist uniform sheet formation, for example an organic polymer (a-d), are effective in this process. In most cases, these possible other components of the pulp suspension also remain entirely or at least substantially in the resulting pulp web. The portion of the wet paper structure which determines the dry content of the wet paper structure contains the retained components pulp, possible other components which are to be present in the finally produced paper, and the possible further components. Depending on their retention behavior, these components are, for example, the mentioned pulp, organic polymers, fillers and other paper auxiliaries. At the end of step (B), the wet paper structure is strong enough to be removed from the water-permeable substrate.

The water permeable substrate in step (B) is preferably a wire. The wire, which has a wire top and a wire bottom, has mesh as fine openings. The wire contains for example a metal or plastic mesh. In the case of a paper machine, the wire is very preferably an endless wire. After the resulting wet paper structure is separated from an endless wire, the endless wire runs back to the stock application where a new second pulp suspension containing polymer P is applied to the running endless wire. Very preferred is an endless wire running around several cylinders. Known wire types for endless wires are the Fourdrinier, the Twin Wire Former with an endless bottom wire and one of its additional endless top wires, the cylinder mold and the cylinder mold former. A Fourdrinier is preferred.

The dry content of the wet paper structure formed in step (B) is preferably 18.7% by weight to 24% by weight, very preferably 18.8% by weight to 23% by weight, particularly preferably 18.9% by weight to 22% by weight, very particularly preferably 19.0% by weight to 21% by weight and especially preferably 19.0% by weight to 20.7% by weight.

In step (C), the wet paper structure obtained in step (B) is dehydrated to form a paper or cardboard. Preferably the dehydration in step (C) comprises the following steps:

(C-1) dehydrating of the wet paper structure by pressing, resulting in a moist paper sheet;
(C-2) dehydrating of the moist paper sheet due to heat input, resulting in the paper or card board.

Pressing the wet paper structure in step (C-1) results in further dehydration and a corresponding increase in dry content. In the case of dehydration by pressing, mechanical pressure is applied to the wet paper structure. Removing water by mechanical pressure is more energy-saving than drying by adding heat. By placing the wet paper structure on a water-absorbent sheet or belt, e.g. a felt-like fabric, the dehydration is supported by absorbing the pressed water. A cylinder is suitable for exerting pressure on the ply bond. Especially the passing of the ply bond through two cylinders, if necessary resting on the water absorbing belt, is suitable. The surface of the cylinder is made of steel, granite or hard rubber, for example. The surface of a cylinder may be covered with a water-absorbent material. The water-absorbent materials have a high degree of absorbency, porosity, strength and elasticity. After contact with the wet paper structure, the water-absorbent materials are in turn drained again, e.g. by a squeegee. At the end of step (C-1) a moist paper sheet is produced. At the end of step (C-1) the moist paper sheet is firm enough to be fed to the next step (C-2) without mechanical support. The moist paper sheet preferably has a dry content of between 35% by weight and 65% by weight, very preferably between 37% by weight and 60% by weight, very particularly preferably between 38% by weight and 55% by weight, especially preferably between 40% by weight and 50% by weight.

In step (C-2), a further dehydration of the moist paper sheet from step (C-1) is carried out by heat input, resulting in the paper or cardboard. The heat input to the moist paper sheet is provided, for example, by heated plates on which the moist paper sheet is placed, by heated cylinders over which the moist paper sheet is passed, by IR radiators, by warm air passed over the moist paper sheet, or by a combination of two, three or all measures.

The resulting paper or cardboard has the highest strength compared to a wet paper structure or the wet paper sheet. It is assumed that from a dry content of 80% by weight, the hydroxyl groups of cellulose fibers are increasingly linked by hydrogen bonds, supplementing the previous mechanical felting of the fibers. A measure of the strength of the paper or cardboard obtained is, for example, the internal strength.

The dry content of the paper or cardboard obtained is preferably at least 88% by weight. The dry content of the paper or cardboard is very preferably between 89% by weight and 100% by weight, particularly preferably between 90% by weight and 98% by weight and very particularly preferably between 91% by weight and 96% by weight.

Depending on the basis weight per unit area, also known as grammage, the name of the flat shaped body resulting from the second pulp suspension containing polymer P changes. A dried molding with a grammage of 7 $g/m^2$ to 225 $g/m^2$ is referred to herein as paper and with a grammage of 225 $g/m^2$ or more is referred to herein as cardboard. The grammage of the paper or cardboard is preferably 20 to 400 g/m2, very preferably 40 to 280 g/m2, particularly preferably 60 to 200 g/m2, very particularly preferably 80 to 160 g/m2, especially preferably 90 to 140 g/m2 and very especially preferably 100 to 130 g/m2.

Preferably the resulting paper or cardboard is a packaging paper, very preferably a corrugated medium.

The preferences for the method for the production of paper or cardboard also apply to the other subject-matters of the invention.

Another subject-matter of the invention is a paper or cardboard obtainable by a method comprising the following steps:

(A) Adding a water-soluble polymer P to a first aqueous pulp suspension having a dry content between 0.1% by weight and 6% by weight, thereby forming a second aqueous pulp suspension containing polymer P by radical polymerization to a polymer V of
(i) 33 to 83 mol % of a monomer of formula I

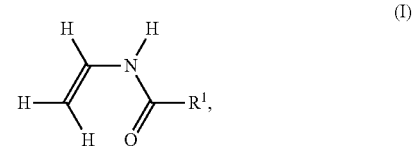

in which $R^1$=H or $C_1$-$C_6$ alkyl, (ii) 6 to 56 mol % of diallyl dimethyl ammonium chloride, diallyl diethyl ammonium chloride or a salt form of a monoethylenically unsaturated monomer with a quaternized nitrogen as the sole charge-bearing group at a pH value of 7, (iii) 11 to 61 mol % of a monoethylenically unsaturated carboxylic acid, a monoethylenically unsaturated sulfonic acid or a monoethylenically unsaturated phosphonic acid, or salt forms thereof, (iv) 0 to 50 mol % of one or more ethylenically unsaturated monomers other than monomer (i), (ii) and (iii), wherein the total amount of all monomers (i), (ii), (iii) and (iv) is 100 mol %, and hydrolyzing the N—C(=O)$R^1$ groups of the units of the monomers of formula (I) polymerized into polymer V to form primary amino or amidine groups to polymer P, wherein at least 87% of the units of the monomers of formula (I) polymerized into polymer V are hydrolyzed, based on the number of all units of the monomers of formula I polymerized into polymer V, (B) dehydration of the second aqueous pulp suspension containing polymer P on a water-permeable substrate to form a wet paper structure having a dry content of between 18.5% and 25% by weight, (C) dehydration of the wet paper structure, resulting in the paper or cardboard.

The paper or cardboard preferably has an internal strength of 190 to 450 J/m$^2$, very preferably of 195 to 380 J/m$^2$, particularly preferably of 200 to 340 J/m$^2$, and very particularly of 205 to 300 J/m$^2$, the internal strength corresponding to that of Tappi specification T833 pm-94.

A further subject-matter of the invention is a water-soluble polymer P obtainable by radical polymerization to a polymer V of
(i) 33 to 83 mol % of a monomer of formula I

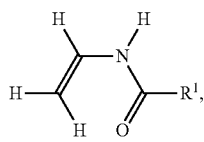

in which $R^1$=H or $C_1$-$C_6$ alkyl, (ii) 6 to 56 mol % of diallyl dimethyl ammonium chloride, diallyl diethyl ammonium chloride or a salt form of a monoethylenically unsaturated monomer with a quaternized nitrogen as the sole charge-bearing group at a pH value of 7, (iii) 11 to 61 mol % of a monoethylenically unsaturated carboxylic acid, a monoethylenically unsaturated sulfonic acid or a monoethylenically unsaturated phosphonic acid, or salt forms thereof, (iv) 0 to 50 mol % of one or more ethylenically unsaturated monomers other than monomer (i), (ii) and (iii), wherein the total amount of all monomers (i), (ii), (iii) and (iv) is 100 mol %, and hydrolyzing the N—C(=O)$R^1$ groups of the units of the monomers of formula (I) polymerized into polymer V to form primary amino or amidine groups to polymer P, wherein at least 87% of the units of the monomers of formula (I) polymerized into polymer V are hydrolyzed, based on the number of all units of the monomers of formula I polymerized into polymer V.

EXAMPLES

The percentages in the examples are percentages by weight, unless stated otherwise.

A) Additives

A-1) Methods for the characterization of polymers

The solid content is determined by spreading 0.5 to 1.5 g of the polymer solution in a metal lid 4 cm in diameter and then drying in a convection dryer at 140° C. for 120 minutes. The ratio of the mass of the sample after drying under the above conditions to the weighed sample mass multiplied by 100 gives the solid content of the polymer solution in % by weight. Drying is carried out at ambient pressure, possibly 101.32 kPa, without correction for deviation due to weather and sea level.

The degree of hydrolysis is the percentage of hydrolyzed N—CHO groups of the N-vinylformamide monomers used in the polymerization in relation to the total amount of N-vinylformamide used in the polymerization. The degree of hydrolysis of homopolymers or copolymers in which N-vinylformamide is used in the polymerization and which are subjected to hydrolysis is determined by enzymatic analysis of the formic acid or formates released during hydrolysis (test set from Boehringer Mannheim).

The polymer content indicates the content of polymer without counterions in the aqueous solution in percentage by weight, i.e. counterions are not considered. The polymer content is the sum of the weight percentages of all structural units of the polymer in g, which are present in 100 g of the aqueous solution. It is determined by calculation. For this purpose, potentially charge-bearing structural units in the charged form are included, i.e., for example, amino groups in the protonated form and acid groups in the deprotonated form. Counterions of the charged structural units such as a sodium cation, chloride, phosphate, formate, acetate, etc. are not taken into account. The calculation may be carried out in such a way that, for a batch, starting from the quantities of monomers used, optionally a degree of hydrolysis of certain monomers and optionally a proportion of reactants which is reacted in a polymer-analogous manner by reaction with the polymer to form a covalent bond, the molar quantities of the structural units of the polymer present at the end of the reaction are determined and these are converted into proportions by weight using the molar masses of the structural units. For this purpose, a complete, i.e. 100% conversion of all monomers or reactants in general is assumed. The sum of the weight fractions gives the total amount of polymer in this approach. The polymer content results from the ratio of the total amount of polymer to the total mass of the batch. In addition to the total amount of polymer mentioned above, the total mass of the batch thus contains reaction medium, possibly cations or anions and everything added to the reaction batch which is not assumed to be incorporated in the polymer. Substances removed from the reaction mixture (e.g. water distilled off, if necessary, etc.) are deducted.

The total content of primary amino groups and/or amidine groups may be determined in the same way as described above for the polymer content. Starting from the quantities of monomers used, the analytically determined degree of hydrolysis, the ratio of amidine groups to primary amino groups determined by $^{13}$C-NMR spectroscopy and, if appropriate, the proportion which has been reacted in a polymer-analogous manner by reaction with the polymer with formation of a covalent bond, the molar composition of the structural units of the polymer present at the end of the reaction is determined. With the aid of the molar mass of the individual structural units, the molar proportion of primary amino groups and/or amidine units in meq which is present in 1 g of polymer may be calculated therefrom. For the determination by $^{13}$C-NMR spectroscopy, the area of the formate group HCOO— (173 [ppm]) may be related to the area of the amidine group —N=CH—N— (152 ppm).

The K-values are measured according to H. Fikentscher, Cellulose Chemistry, Volume 13, 48-64 and 71-74 under the conditions indicated in each case. The values in brackets indicate the concentration of the polymer solution based on the polymer content as well as the solvent. The measurements were carried out at 25° C. and a pH value of 7.5.

Unless otherwise specified, only completely desalinated water was used in the production of the additives.

A-2) Polymerizations and Hydrolysis

Example P-P1

Additive 1

((hydrolyzed terpolymer VFA/DADMAC/Na-acrylate=40 mol %/30 mol %/30 mol %, K-value 95)

a) Polymerization Precursor V1

As feed 1, a mixture of 209.8 g aqueous 32% by weight Na-acrylate solution adjusted to a pH value of 6.4 and 68.3 g N-vinylformamide was provided.

As feed 2, 1.5 g 2,2'-azobis(2-methylpropionamidine) dihydrochloride was dissolved in 74.5 g water at room temperature.

As feed 3, 1.6 g of 2,2'-azobis(2-methylpropionamidine) dihydrochloride was dissolved in 80.4 g of water at room temperature.

As feed 4, 200 g water and as feed 5, 340 g water was provided.

In a 2-L-glass apparatus with anchor stirrer, descending condenser, internal thermometer and nitrogen introduction tube, 200 g water and 2.2 g 75% by weight phosphoric acid were prepared. At a speed of 100 rpm, approx. 3.0 g of a 25% by weight caustic soda lye was added so that a pH value of 6.5 was achieved. Subsequently, 177.3 g of a 65% by weight aqueous DADMAC (=diallyl dimethyl ammonium chloride) solution was mixed in. The receiver was heated to 63° C. and the pressure in the apparatus was reduced to approx. 210 mbar, so that the reaction mixture just started boiling at 63° C. Then feeds 1 and 2 were started simultaneously and dosed synchronously in 4 h at a constant 63° C. 1.5 h after starting feed 1, water feed 4 was started and dosed in 2.5 h. After the end of feeds 1, 2 and 4, feed 3 was added within 2 h. 30 min after starting feed 3 (=4.5 h after starting feed 1) the pressure was set to 500 mbar and the internal temperature was increased to 85° C. After the end of feed 3, the batch was kept at 85° C. for another hour and then feed 5 was mixed in as quickly as possible. The batch was cooled down to room temperature and the vacuum was released by venting with normal air. Water was constantly distilled off during the entire polymerization time (7 h), so that a total of 108 g was distilled off.

The result was a yellow, highly viscous solution with a solids content of 20.5% by weight. The K-value of the copolymer was 95 (0.5% by weight in 5% by weight aqueous NaCl solution).

b) Hydrolysis to Final Product Additive 1

190.0 g of the polymer solution V1 obtained above were mixed with 0.8 g of a 40% by weight aqueous sodium bisulfite solution in a 500 ml four-necked flask with leaf stirrer, internal thermometer, dropping funnel and reflux condenser at a stirrer speed of 80 rpm and then heated to 80° C. Then 28.0 g of a 25% by weight aqueous sodium hydroxide solution was added. The mixture was kept at 80° C. for 7 hours. The product obtained was cooled to room temperature and adjusted to a pH value of 6.8 by the addition of 15.9 g of 37% by weight hydrochloric acid.

A slightly yellow, viscous polymer solution was obtained with a solid content of 20.6% by weight and a polymer content of 12.0% by weight. The degree of hydrolysis of the vinylformamide units was 94 mol %.

Example P-P2

Additive 2

(hydrolyzed terpolymer VFA/DADMAC/Na-acrylate=35 mol %/35 mol %/30 mol %, K-value 79)

a) Polymerization Precursor V2

As feed 1, a mixture of 209.8 g aqueous 32% by weight Na-acrylate solution adjusted to a pH value of 6.4 and 59.8 g N-vinylformamide was provided.

As feed 2, 1.6 g of 2,2'-azobis(2-methylpropionamidine) dihydrochloride was dissolved in 78.4 g of water at room temperature.

As feed 3, 1.7 g of 2,2'-azobis(2-methylpropionamidine) dihydrochloride was dissolved in 84.3 g of water at room temperature.

As feed 4, 200 g water and as feed 5, 340 g water was provided.

In a 2-L-glass apparatus with anchor stirrer, descending cooler, internal thermometer and nitrogen introduction tube, 200 g water and 2.2 g 75% by weight phosphoric acid were added. At a speed of 100 rpm, approx. 3.0 g of a 25% by weight caustic soda lye was added so that a pH value of 6.5 was achieved. Subsequently, 206.8 g of a 65% by weight aqueous DADMAC solution were mixed in. The receiver was heated to 63° C. and the pressure in the apparatus was reduced to about 210 mbar, so that the reaction mixture just started boiling at 63° C. Then feeds 1 and 2 were started simultaneously and added synchronously in 4 h at constant 63° C. 1.5 h after starting feed 1, water feed 4 was started and added in 2.5 h. After the end of feeds 1, 2 and 4, feed 3 was added within 2 h. 30 min after starting feed 3 (=4.5 h after starting feed 1) the pressure was set to 500 mbar and the internal temperature was increased to 85° C. After the end of feed 3, the batch was kept at 85° C. for another hour and then mixed into feed 5 as quickly as possible. The batch was cooled down to room temperature and the vacuum was released by aeration with normal air. Water was constantly distilled off during the entire polymerization time (7 h), so that a total of 96 g was distilled off.

The result was a yellow, viscous solution with a solid content of 20.6% by weight. The K-value of the copolymer was 79 (0.5% by weight in 5% by weight aqueous NaCl solution).

b) Hydrolysis to Final Product 190.0 g of the polymer solution V2 obtained above were mixed with 0.6 g of a 40% by weight aqueous sodium bisulfite solution in a 500 ml four-necked flask with leaf stirrer, internal thermometer, dropping funnel and reflux condenser at a stirrer speed of 80 rpm and then heated to 80° C. Then 25.0 g of a 25% by weight aqueous sodium hydroxide solution was added. The mixture was kept at 80° C. for 8 hours. The product obtained was cooled to room temperature and adjusted to a pH value of 6.7 by the addition of 13.1 g of 37% by weight hydrochloric acid.

A slightly yellow, viscous polymer solution with a solid content of 20.6% and a polymer content of 12.7% was obtained. The degree of hydrolysis of the vinylformamide units was 95 mol %.

Example P-P3

Additive 3

(hydrolyzed terpolymer VFA/DADMAC/Na-acrylate=40 mol %/40 mol %/20 mol %, K-value 71)

a) Polymerization Precursor V3

As feed 1, a mixture of 134.2 g aqueous 32% by weight Na-acrylate solution adjusted to a pH value of 6.4 and 65.5 g N-vinylformamide was provided.

As feed 2, 1.6 g of 2,2'-azobis(2-methylpropionamidine) dihydrochloride was dissolved in 78.4 g of water at room temperature.

As feed 3, 1.4 g of 2,2'-azobis(2-methylpropionamidine) dihydrochloride was dissolved in 70.6 g of water at room temperature.

As feed 4, 200 g water and as feed 5, 540 g water was provided.

In a 2-L-glass apparatus with anchor stirrer, descending cooler, internal thermometer and nitrogen introduction tube, 200 g water and 2.2 g 75% by weight phosphoric acid were added. At a speed of 100 rpm, approx. 3.0 g of a 25% by weight caustic soda lye was added so that a pH value of 6.5 was achieved. Subsequently, 226.8 g of a 65% by weight aqueous DADMAC solution were mixed in. The receiver is heated to 63° C. and the pressure in the apparatus is reduced to approx. 210 mbar, so that the reaction mixture just started boiling at 63° C. Then feeds 1 and 2 were started simultaneously and dosed synchronously in 4 h at a constant 63° C. 1.5 h after starting feed 1, water feed 4 was started and dosed in 2.5 h. After the end of feeds 1, 2 and 4, feed 3 was added within 2 h. 30 min after starting feed 3 (=4.5 h after starting feed 1) the pressure was set to 500 mbar and the internal temperature was increased to 85° C. After the end of feed 3, the batch was kept at 85° C. for another hour and then mixed into feed 5 as quickly as possible. The batch was cooled down to room temperature and the vacuum was released by aeration with normal air. Water was constantly distilled off during the entire polymerization time (7 h), so that a total of 207 g was distilled off.

The result was a slightly yellow, viscous solution with a solids content of 20.8% by weight. The K-value of the copolymer was 71 (0.5% by weight in 5% by weight aqueous NaCl solution).

b) Hydrolysis to Final Product 210.0 g of the polymer solution V3 obtained above were mixed with 0.8 g of a 40% by weight aqueous sodium bisulfite solution in a 500 ml four-necked flask with leaf stirrer, internal thermometer, dropping funnel and reflux condenser at a stirrer speed of 80 rpm and then heated to 80° C. Then 26.8 g of a 25% by weight aqueous sodium hydroxide solution were added. The mixture was kept at 80° C. for 5.5 h. The product obtained was cooled to room temperature and adjusted to a pH value of 7.0 by the addition of 13.7 g of 37% by weight hydrochloric acid.

A slightly yellow, viscous polymer solution with a solid content of 20.5% by weight and a polymer content of 12.7% by weight was obtained. The degree of hydrolysis of the vinylformamide units was 97 mol %.

Example P-P4

Additive 4

(hydrolyzed terpolymer VFA/DADMAC/Na-acrylate=50 mol %/20 mol %/30 mol %, K-value 97)

a) Polymerization Precursor V4

As feed 1, a mixture of 284.1 g aqueous 32% by weight Na-acrylate solution adjusted to a pH value of 6.4 and 115.6 g N-vinylformamide (99%) was provided.

As feed 2, 0.9 g 2,2'-azobis(2-methylpropionamidine) dihydrochloride was dissolved in 45.4 g water at room temperature.

As feed 3, 1.7 g of 2,2'-azobis(2-methylpropionamidine) dihydrochloride was dissolved in 84.2 g of water at room temperature.

As feed 4, 200 g water and as feed 5, 228 g water was provided.

In a 2-L-glass apparatus with anchor stirrer, descending cooler, internal thermometer and nitrogen introduction tube, 200 g water and 3.0 g 75% by weight phosphoric acid were added. At a speed of 100 rpm, approx. 4.7 g of a 25% by weight caustic soda lye were added so that a pH of 6.6 was achieved. Subsequently, 160.0 g of a 65% by weight aqueous DADMAC solution was mixed in. The receiver was heated to 66° C. and the pressure in the apparatus was reduced to about 250 mbar, so that the reaction mixture just started boiling at 66° C. Then feeds 1 and 2 were started simultaneously and dosed synchronously in 4 h at constant 66° C. 1.5 h after starting feed 1, water feed 4 was started and dosed in 2.5 h. After the end of feeds 1, 2 and 4, feed 3 was added within 2 h. 1 h after starting feed 3 (=5 h after starting feed 1) the pressure was set to 650 mbar and the internal temperature was increased to 90° C. After the end of feed 3, the batch was kept at 85° C. for another hour and then mixed into feed 5 as quickly as possible. The batch was cooled down to room temperature and the vacuum was released by aeration with normal air. Water was constantly distilled off during the entire polymerization time (7 h), so that a total of 78 g was distilled off.

The result was a slightly yellow, highly viscous solution with a solids content of 26.7% by weight. The K-value of the copolymer was 97 (0.5% by weight in 5% by weight aqueous NaCl solution).

b) Hydrolysis to Final Product 180.0 g of the polymer solution V4 obtained above were mixed with 1.3 g of a 40% by weight aqueous sodium bisulfite solution in a 500 ml four-necked flask with leaf stirrer, internal thermometer, dropping funnel and reflux condenser at a stirrer speed of 80 rpm and then heated to 80° C. Then 43.1 g of a 25% by weight aqueous sodium hydroxide solution was added. The mixture was kept at 80° C. for 6 h. The product obtained was cooled to room temperature and adjusted to a pH value of 7.8 by the addition of 21.2 g 37% by weight hydrochloric acid by weight.

The result was a slightly yellow, viscous polymer solution with a solid content of 24.8% by weight and a polymer content of 13.8% by weight. The degree of hydrolysis of the vinylformamide units was 95 mol %.

Example P-P5

Additive 5

(hydrolyzed terpolymer VFA/DADMAC/Na-acrylate=60 mol %/10 mol %/30 mol %, K-value 100)

a) Polymerization Precursor V5

As feed 1, a mixture of 313.6 g aqueous 32% by weight Na acrylate solution adjusted to a pH value of 6.4 and 153.2 g N-vinylformamide was provided.

As feed 2, 1.8 g of 2,2'-azobis(2-methylpropionamidine) dihydrochloride was dissolved in 86.7 g of water at room temperature.

As feed 3, 1.0 g of 2,2'-azobis(2-methylpropionamidine) dihydrochloride was dissolved in 47.6 g of water at room temperature.

As feed 4, 200 g water and as feed 5, 265 g water was provided.

In a 2-L-glass apparatus with anchor stirrer, descending cooler, internal thermometer and nitrogen introduction tube, 200 g water and 3.0 g 75% by weight phosphoric acid were added. At a speed of 100 rpm, approx. 4.7 g of a 25% by weight caustic soda lye were added so that a pH value of 6.5 was achieved. Subsequently, 88.3 g of a 65% by weight aqueous DADMAC solution were mixed in. The receiver was heated to 63° C. and the pressure in the apparatus was reduced to about 210 mbar, so that the reaction mixture just started boiling at 63° C. Then feeds 1 and 2 were started simultaneously and dosed synchronously in 4 h at constant 63° C. 1.5 h after starting feed 1, water feed 4 was started and dosed in 2.5 h. After the end of feeds 1, 2 and 4, feed 3 was added within 2 h. 1 h after starting feed 3 (=5 h after starting feed 1) the pressure was set to 380 mbar and the internal temperature was increased to 75° C. After the end of feed 3, the preparation was kept at 75° C. for another hour and then mixed into feed 5 as quickly as possible. The preparation was cooled down to room temperature and the vacuum was released by aeration with normal air. Water was constantly distilled off during the entire polymerization time (7 h), so that a total of 114 g was distilled off.

The result was a yellow, highly viscous solution with a solids content of 24.5% by weight. The K-value of the copolymer was 100 (0.5% by weight in 5% by weight aqueous NaCl solution).

b) Hydrolysis to Final Product 170.0 g of the polymer solution V5 obtained above were mixed with 1.5 g of a 40% by weight aqueous sodium bisulfite solution in a 500 mL four-necked flask with leaf stirrer, internal thermometer, dropping funnel and reflux condenser at a stirrer speed of 80 rpm and then heated to 80° C. Then 49.5 g of a 25% by weight aqueous sodium hydroxide solution were added. The mixture was kept at 80° C. for 7 h. The product obtained was cooled to room temperature and adjusted to a pH value of 8.1 by the addition of 22.2 g of 37% by weight hydrochloric acid.

A slightly yellow, viscous polymer solution was obtained with a solid content of 22.9% by weight and a polymer content of 11.8% by weight. The degree of hydrolysis of the vinylformamide units was 96 mol %.

Example P-P6

Additive 6

(hydrolyzed copolymer VFA/DADMAC/Na-acrylate/TAACl=39.99 mol %/30.02 mol %/29.97 mol %/0.02 mol %, simplified description: crosslinked hydrolyzed terpolymer VFA/DADMAC/Na-acrylate/=40 mol %/30 mol %/30 mol % and 0.02 mol % TAACl as crosslinker, K-value 86)

a) Polymerization Precursor V6

As feed 1, a mixture of 209.8 g aqueous 32% by weight Na-acrylate solution adjusted to a pH value of 6.4, 68.3 g N-vinylformamide and 0.1 g N,N,N-tetraallylammonium chloride was provided.

As feed 2, 1.5 g 2,2'-azobis(2-methylpropionamidine) dihydrochloride was dissolved in 74.5 g water at room temperature.

As feed 3, 1.6 g of 2,2'-azobis(2-methylpropionamidine) dihydrochloride was dissolved in 80.4 g of water at room temperature.

As feed 4, 200 g water and as feed 5, 340 g water was provided

In a 2-L-glass apparatus with anchor stirrer, descending cooler, internal thermometer and nitrogen introduction tube, 200 g water and 2.2 g 75% by weight phosphoric acid were added. At a speed of 100 rpm, approx. 3.0 g of a 25% by weight caustic soda lye was added so that a pH value of 6.5 was achieved. Subsequently, 177.3 g of a 65% by weight aqueous DADMAC solution were mixed in. The receiver was heated to 63° C. and the pressure in the apparatus was reduced to about 210 mbar, so that the reaction mixture just started boiling at 63° C. Then feeds 1 and 2 were started simultaneously and dosed synchronously in 4 h at constant 63° C. 1.5 h after starting feed 1, water feed 4 was started and dosed in 2.5 h. After the end of feeds 1, 2 and 4, feed 3 was added within 2 h. 30 min after starting feed 3 (=4.5 h after starting feed 1) the pressure was set to 500 mbar and the internal temperature was increased to 85° C. After the end of feed 3, the batch was kept at 85° C. for another hour and then mixed into feed 5 as quickly as possible. The batch was cooled down to room temperature and the vacuum was released by aeration with normal air. Water was constantly distilled off during the entire polymerization time (7 h), so that a total of 109 g was distilled off.

The result was a yellow, viscous solution with a solid content of 20.4% by weight. The K-value of the copolymer was 86 (0.5% by weight in 5% by weight aqueous NaCl solution).

b) Hydrolysis to Final Product 190.0 g of the polymer solution V6 obtained above were mixed with 0.8 g of a 40% by weight aqueous sodium bisulfite solution in a 500 ml four-necked flask with leaf stirrer, internal thermometer, dropping funnel and reflux condenser at a stirrer speed of 80 rpm and then heated to 80° C. Then 25.3 g of a 25% by weight aqueous sodium hydroxide solution were added. The mixture was kept at 80° C. for 7 h. The product obtained was cooled to room temperature and adjusted to a pH value of 6.8 by adding 13.8 g of 37% by weight hydrochloric acid.

A slightly yellow, viscous polymer solution was obtained with a solid content of 20.1% by weight and a polymer content of 12.2% by weight. The degree of hydrolysis of the vinylformamide units was 93 mol %.

Example P-P7

Additive 7

(hydrolyzed terpolymer VFA/DADMAC/Na methacrylate=40 mol %/30 mol %/30 mol %, K-value 74)

a) Polymerization Precursor V7

As feed 1, a mixture of 257.1 g aqueous 30% by weight Na-methacrylate solution adjusted to a pH value of 6.4 and 68.3 g N-vinylformamide was provided.

As feed 2, 1.6 g of 2,2'-azobis(2-methylpropionamidine) dihydrochloride was dissolved in 77.4 g of water at room temperature.

As feed 3, 1.7 g of 2,2'-azobis(2-methylpropionamidine) dihydrochloride was dissolved in 84.3 g of water at room temperature.

As feed 4, 340 g water was provided.

In a 2-L-glass apparatus with anchor stirrer, descending cooler, internal thermometer and nitrogen introduction tube 200 g water and 2.2 g 75% by weight phosphoric acid were provided. At a speed of 100 rpm, approx. 3.0 g of a 25% by weight caustic soda lye was added so that a pH value of 6.5 was achieved. Then 177.3 g of a 65% by weight aqueous DADMAC solution was mixed in. The receiver was heated to 63° C. and the pressure in the apparatus was reduced to approx. 210 mbar, so that the reaction mixture just started boiling at 63° C. Then feeds 1 and 2 were started simultaneously and dosed synchronously in 4 h at constant 63° C. After the end of feeds 1 and 2, feed 3 was added within 2 h. 30 min after starting feed 3 (=4.5 h after starting feed 1) the pressure was set to 500 mbar and the internal temperature was increased to 85° C. After the end of feed 3, the batch was kept at 85° C. for another hour and then mixed into feed 4 as quickly as possible. The preparation was cooled down to room temperature and the vacuum was released by aeration with normal air. Water was constantly distilled off during the entire polymerization time (7 h), so that a total of 138 g was distilled off.

The result was a yellow, highly viscous solution with a solids content of 24.8% by weight. The K-value of the copolymer was 74 (0.5% by weight in 5% by weight aqueous NaCl solution).

b) Hydrolysis to Final Product 180.0 g of the polymer solution V7 obtained above were mixed with 0.8 g of a 40% by weight aqueous sodium bisulfite solution in a 500 ml four-necked flask with leaf stirrer, internal thermometer, dropping funnel and reflux condenser at a stirrer speed of 80 rpm and then heated to 80° C. Then 30.6 g of a 25% by weight aqueous sodium hydroxide solution were added. The mixture was kept at 80° C. for 8 h. The product obtained was cooled to room temperature and adjusted to a pH value of 6.8 by adding 17.0 g 37% by weight hydrochloric acid.

The result was a slightly yellow, viscous polymer solution with a solid content of 25.0% by weight and a polymer content of 14.4% by weight. The degree of hydrolysis of the vinylformamide units was 90 mol %.

Example P-P8

Additive 8

(hydrolyzed terpolymer VFA/DADMAC/Na-acrylate=40 mol %/30 mol %/30 mol %, K-value 97)

a) Polymerization Precursor V8

As feed 1, a mixture of 209.8 g aqueous 32% by weight Na-acrylate solution adjusted to a pH value of 6.4 and 68.3 g N-vinylformamide was provided.

As feed 2, 1.5 g of 2,2'-azobis(2-methylpropionamidine) dihydrochloride was dissolved in 74.5 g of water at room temperature.

As feed 3, 1.6 g of 2,2'-azobis(2-methylpropionamidine) dihydrochloride was dissolved in 80.4 g of water at room temperature.

As feed 4, 200 g water and as feed 5, 390 g water was provided.

In a 2-L-glass apparatus with anchor stirrer, descending cooler, internal thermometer and nitrogen introduction tube 200 g water and 2.2 g 75% by weight phosphoric acid were provided. At a speed of 100 rpm, approx. 3.0 g of a 25% by weight caustic soda lye was added so that a pH value of 6.5 was achieved. Afterwards 177.3 g of a 65% by weight aqueous DADMAC solution were mixed in. The receiver was heated to 63° C. and the pressure in the apparatus was reduced to approx. 210 mbar, so that the reaction mixture just started boiling at 63° C. Then feeds 1 and 2 were started simultaneously and dosed synchronously in 4 h at constant 63° C. 1.5 h after starting feed 1, water feed 4 was started and dosed in 2.5 h. After the end of feeds 1, 2 and 4, feed 3 was added within 2 h. 30 min after starting feed 3 (=4.5 h after starting feed 1) the pressure was set to 500 mbar and the internal temperature was increased to 85° C. After the end of feed 3, the batch was kept at 85° C. for another hour and then mixed into feed 5 as quickly as possible. The preparation was cooled down to room temperature and the vacuum was released by aeration with normal air. Water was constantly distilled off during the entire polymerization time (7 h), so that a total of 150 g was distilled off.

The result was a yellow, highly viscous solution with a solid content of 20.5% by weight. The K-value of the copolymer was 97 (0.5% by weight in 5% by weight aqueous NaCl solution).

b) Hydrolysis to Final Product 170.0 g of the polymer solution V8 obtained above were mixed with 0.7 g of a 40% by weight aqueous sodium bisulfite solution in a 500 ml four-necked flask with leaf stirrer, internal thermometer, dropping funnel and reflux condenser at a stirrer speed of 80 rpm and then heated to 80° C. Then 21.8 g of a 25% by weight aqueous sodium hydroxide solution were added. The mixture was kept at 80° C. for 8 h. The product obtained was cooled to room temperature and adjusted to a pH value of 7.0 by adding 11.9 g 37% by weight hydrochloric acid.

A slightly yellow, viscous polymer solution with a solid content of 20.7% by weight and a polymer content of 12.5% by weight was obtained. The degree of hydrolysis of the vinylformamide units was 88 mol %.

Example P-P9

Additive 9

(hydrolyzed terpolymer VFA/DADMAC/Na-acrylate=40 mol %/30 mol %/30 mol %, K-value 97)

a) Polymerization Precursor V9

As feed 1, a mixture of 209.8 g aqueous 32% by weight Na-acrylate solution adjusted to a pH value of 6.4 and 68.3 g N-vinylformamide was provided.

As feed 2, 1.5 g of 2,2'-azobis(2-methylpropionamidine) dihydrochloride was dissolved in 74.5 g of water at room temperature.

As feed 3, 1.6 g of 2,2'-azobis(2-methylpropionamidine) dihydrochloride was dissolved in 80.4 g of water at room temperature.

As feed 4, 200 g water and as feed 5, 390 g water was provided.

In a 2-L-glass apparatus with anchor stirrer, descending cooler, internal thermometer and nitrogen introduction tube 200 g water and 2.2 g 75% by weight phosphoric acid were provided. At a speed of 100 rpm, approx. 3.0 g of a 25% by weight caustic soda lye was added so that a pH value of 6.5 was achieved. Afterwards 177.3 g of a 65% by weight aqueous DADMAC solution were mixed in. The receiver was heated to 63° C. and the pressure in the apparatus was reduced to approx. 210 mbar, so that the reaction mixture just started boiling at 63° C. Then feeds 1 and 2 were started simultaneously and dosed synchronously at constant 63° C. in 4 h. 1.5 h after starting feed 1, water feed 4 was started and dosed in 2.5 h. After the end of feeds 1, 2 and 4, feed 3 was added within 2 h. 30 min after starting feed 3 (=4.5 h after starting feed 1) the pressure was set to 500 mbar and the internal temperature was increased to 85° C. After the end of feed 3, the preparation was kept at 85° C. for another hour and then mixed into feed 5 as quickly as possible. The preparation was cooled down to room temperature and the vacuum was released by aeration with normal air. Water was constantly distilled off during the entire polymerization time (7 h), so that a total of 150 g was distilled off.

The result was a yellow, highly viscous solution with a solid content of 20.5% by weight. The K-value of the copolymer was 95 (0.5% by weight in 5% by weight aqueous NaCl solution).

b) Hydrolysis to Final Product 190.0 g of the polymer solution V9 obtained above were mixed with 0.8 g of a 40% by weight aqueous sodium bisulfite solution in a 500 ml four-necked flask with leaf stirrer, internal thermometer, dropping funnel and reflux condenser at a stirrer speed of 80 rpm and then heated to 80° C. Then 20.7 g of a 25% by weight aqueous sodium hydroxide solution were added. The mixture was kept at 80° C. for 8 h. The product obtained was cooled to room temperature and adjusted to a pH value of 7.1 by adding 11.3 g 37% by weight hydrochloric acid.

A slightly yellow, viscous polymer solution with a solid content of 20.3% by weight and a polymer content of 12.6% by weight was obtained. The degree of hydrolysis of the vinylformamide units was 85 mol %.

Example P-P10

Additive 10

(hydrolyzed copolymer VFA/Na-acrylate=70 mol %/30 mol %, K-value 90)

a) Polymerization Precursor V10

As feed 1, a mixture of 100.0 g water, 224.6 g aqueous 32% by weight Na-acrylate solution adjusted to a pH value of 6.4 and 128.0 g N-vinylformamide was provided.

As feed 2, 0.9 g of 2,2'-azobis(2-methylpropionamidine) dihydrochloride was dissolved in 125.8 g of water at room temperature.

In a 2-L-glass apparatus with anchor stirrer, descending condenser, internal thermometer and nitrogen introduction tube, 407 g water and 1.9 g 85% by weight phosphoric acid were provided. At a speed of 100 rpm approx. 3.7 g of a 25% by weight caustic soda lye were added, so that a pH of 6.6 was achieved. The receiver was heated to 80° C. and the pressure in the apparatus was reduced to about 450 mbar, so that the reaction mixture just started boiling at 80° C. Then feeds 1 and 2 were started simultaneously. At constant 80° C. feed 1 was added in 1.5 h and feed 2 in 2.5 h. After the addition of feed 2 was completed, the reaction mixture was postpolymerized for another 2.5 h at 80° C. During the entire polymerization and post-polymerization, approx. 143 g of water were distilled off. The batch was then cooled to room temperature under normal pressure.

The result was a yellow, viscous solution with a solid content of 23.8% by weight. The K-value of the copolymer was 90 (0.5% by weight in 5% by weight aqueous NaCl solution).

b) Hydrolysis to Final Product 847.2 g of the polymer solution V10 obtained above were mixed with 9.3 g of a 40% by weight aqueous sodium bisulfite solution in a 2 L four-neck flask with leaf stirrer, internal thermometer, dropping funnel and reflux condenser at a stirrer speed of 80 rpm and then heated to 80° C. Then 313.7 g of a 25% by weight aqueous sodium hydroxide solution were added. The mixture was kept at 80° C. for 7 h. The product obtained was cooled to room temperature and adjusted to a pH value of 8.5 by adding 117.0 g 37% by weight hydrochloric acid.

A slightly yellow, viscous polymer solution with a solid content of 23.0% by weight and a polymer content of 9.9% by weight was obtained. The degree of hydrolysis of the vinylformamide units was 98 mol %.

Example P-P11

Additive 11

(hydrolyzed terpolymer VFA/DADMAC/Na-acrylate=30 mol %/30 mol %/40 mol %, K-value 92)

a) Polymerization Precursor V11

As feed 1, a mixture of 273.8 g aqueous 32% by weight Na-acrylate solution adjusted to a pH value of 6.4 and 50.1 g N-vinylformamide was provided.

As feed 2, 1.6 g of 2,2'-azobis(2-methylpropionamidine) dihydrochloride was dissolved in 65.0 g of water at room temperature.

As feed 3, 0.9 g 2,2'-azobis(2-methylpropionamidine) dihydrochloride was dissolved in 35.0 g water at room temperature.

As feed 4 200 g water and as feed 5 350 g water was provided

In a 2-L-glass apparatus with anchor stirrer, descending cooler, internal thermometer and nitrogen introduction tube 200 g water and 2.2 g 75% by weight phosphoric acid were added. At a speed of 100 rpm, approx. 3.0 g of a 25% by weight caustic soda lye was added so that a pH value of 6.5 was achieved. Then 173.5 g of a 65% by weight aqueous DADMAC solution was mixed in. The receiver was heated to 63° C. and the pressure in the apparatus was reduced to approx. 210 mbar, so that the reaction mixture just started boiling at 63° C. Then feeds 1 and 2 were started simultaneously and dosed synchronously at constant 63° C. in 4 h. 1.5 h after starting feed 1, water feed 4 was started and dosed in 2.5 h. After the end of feeds 1, 2 and 4, feed 3 was added within 2 h. 30 min after starting Feed 3 (=4.5 h after starting feed 1) the pressure was set to 500 mbar and the internal temperature was increased to 85° C. After the end of feed 3, the batch was kept at 85° C. for another hour and then mixed into feed 5 as quickly as possible. The preparation was cooled down to room temperature and the vacuum was released by aeration with normal air. Water was constantly distilled off during the entire polymerization time (7 h), so that a total of 85 g was distilled off. The result was a yellow, viscous solution with a solid content of 20.4% by weight. The K-value of the copolymer was 95 (0.5% by weight in 5% by weight aqueous NaCl solution).

b) Hydrolysis to Final Product 200.0 g of the polymer solution V11 obtained above were mixed with 0.6 g of a 40% by weight aqueous sodium bisulfite solution in a 500 ml four-necked flask with leaf stirrer, internal thermometer, dropping funnel and reflux condenser at a stirrer speed of 80 rpm and then heated to 80° C. Then 19.7 g of a 25% by weight aqueous sodium hydroxide solution were added. The mixture was kept at 80°

C. for 8 h. The product obtained was cooled to room temperature and adjusted to a pH value of 6.3 by adding 11.8 g 37% by weight hydrochloric acid.

copolymers. The calculation is based on the experimentally determined degree of hydrolysis of the N-vinylformamide used for polymerization.

TABLE TabA1

| Polymer | N-vinyl formamide [mol %][a] | DADMAC[b] [mol %][a] | Sodium acrylate [mol %][a] | Sodium methacrylate [mol %][a] | TAAC[c] [mol %][a] | K-value |
|---|---|---|---|---|---|---|
| V1 | 40 | 30 | 30 | — | — | 95 |
| V2 | 35 | 35 | 30 | — | — | 79 |
| V3 | 40 | 40 | 20 | — | — | 71 |
| V4 | 50 | 20 | 30 | — | — | 97 |
| V5 | 60 | 10 | 30 | — | — | 100 |
| V6 | 40 | 30 | 30 | — | 0.02[d] | 86 |
| V7 | 40 | 30 | — | 30 | — | 74 |
| V8 | 40 | 30 | 30 | — | — | 97 |
| V9 | 40 | 30 | 30 | — | — | 95 |
| V10 | 70 | — | 30 | — | — | 90 |
| V11 | 30 | 30 | 40 | — | — | 95 |

Footnotes:
[a] Molar quantity used in percent of all monomers used
[b] DADMAC = diallyl dimethyl ammonium chloride
[c] TAAC = N,N,N,N-Tetraallylammonium chloride
[d] Due to the very small percentage content of 0.02 mol % no percentage deduction for one of the other three monomers TABLE TabA2

| Polymer | Degree of hydrolysis [%][c] | Non-hydrolyzed N—CHO of the original N-vinyl formamide[e] [mol %][d] | Hydrolyzed N—CHO of the original formamide[f] [mol %][d] | Primary amine or amidin[g] [mol %][d] | Quaternized nitrogen From DADMAC[h] [mol %][d] | Carboxylate groups of acrylate or methacrylate[i] [mol %][d] | Cationic groups minus anionic groups[j] [mol %][d] |
|---|---|---|---|---|---|---|---|
| 1 [b] | 94 | 2.4 | 37.6 | 37.6 | 30 | 30 | 37.6 |
| 2 [b] | 95 | 1.7 | 33.3 | 33.3 | 35 | 30 | 38.3 |
| 3 [b] | 97 | 1.2 | 38.8 | 38.8 | 40 | 20 | 58.8 |
| 4 [b] | 95 | 2.5 | 47.5 | 47.5 | 20 | 30 | 37.5 |
| 5 [b] | 96 | 2.4 | 57.6 | 57.6 | 10 | 30 | 37.6 |
| 6 [b] | 93 | 2.8 | 37.2 | 37.2 | 30[k] | 30 | 37.2[k] |
| 7 [b] | 90 | 4.0 | 36.0 | 36.0 | 30 | 30 [l] | 36.0 |
| 8 [b] | 88 | 4.8 | 35.2 | 35.2 | 30 | 30 | 35.2 |
| 9 [a] | 85 | 6.0 | 34.0 | 34.0 | 30 | 30 | 34.0 |
| 10 [a] | 98 | 1.4 | 68.6 | 68.6 | — | 30 | 38.6 |
| 11 [a] | 92 | 2.4 | 27.6 | 27.6 | 30 | 40 | 17.6 |

Footnotes:
[a] Comparative
[b] According to invention
[c] Percentage of the number of hydrolyzed N—CHO groups relative to the number of all N-vinylformamides used in the polymerization
[d] Molar amount in percent based on all monomers of the non-hydrolyzed polymer used
[e] Non-hydrolyzed N—CHO groups of the N-vinyl formamide used in the polymerization calculated on the basis of the amount of N-vinyl formamide used in the polymerization minus hydrolyzed N—CHO groups of the N-vinyl formamide used in the polymerization
[f] Hydrolyzed N—CHO groups of the N-vinylformamide used in the polymerization calculated on the basis of the amount of N-vinylformamide used in the polymerization and a certain degree of hydrolysis
[g] Primary amine or amidine (if primary amine cyclized with adjacent remaining N—CHO group)
[h] DADMAC = diallyl dimethyl ammonium chloride
[i] Carboxylate groups calculated on the basis of sodium acrylate or sodium methacrylate used for polymerization
[j] Primary amine, amidine and quaternized nitrogen as cationic groups
[k] Plus a small amount of 0.02 mol % of quaternized nitrogen from N,N,N,N-tetraallylammonium chloride
[l] Here sodium methyl acrylate instead of sodium acrylate during polymerization The result was a slightly yellow, viscous polymer solution with a solid content of 20.8% by weight and a polymer content of 12.9% by weight. The degree of hydrolysis of the vinylformamide units was 92 mol %.

A-3) Overview of the Polymers Produced

Table TabA1 shows the monomers used for the polymerization of the non-hydrolyzed precursors and the K-value obtained for the polymer. Table TabA2 shows the calculated contents of polymerized functionalities of the hydrolyzed B) Papers
B-1) Physical Characterizations
Determination of Dry Content For the determination of the dry content (TG), the mass of the moist sample (MF) is determined from a moist paper sample on a calibrated top-pan dial balance, which can be weighed to 0.01 g. Preferably, the wet paper sample has an area of at least 10 cm×10 cm. The moist paper sample is then placed in a calibrated drying cabinet, which can maintain a set temperature to within ±2° C. deviation, and dried at a set temperature of 105° C. until the mass is constant. This is typically achieved after 90 minutes. The still warm dried paper sample is then transferred to a desiccator containing a suitable drying agent such as silica gel. After cooling to room temperature, the mass of the dried paper sample (MT) is determined on the above-mentioned balance. The dry content of the paper sample is calculated according to TG=100·MT/MF and is given in % by weight. The percentage value is often given with one decimal place. If this percentage does not change with the rounded first decimal place, this is the indication that mass constancy has been reached for dry contents from 1 to 100% by weight. For dry contents from 0 to less than 1% by weight, the rounded second decimal place of the percentage value is the corresponding indication. Drying takes place at ambient pressure, possibly 101.32 kPa, without correction for any deviation caused by weather and sea level. Drying shall be carried out at ambient pressure, 101.32 kPa if necessary. No correction is made for a slightly different air pressure due to weather and sea level. In the case of a moist sample which does not yet have a sheet consistency, e.g. a pulp suspension or a pulp, the moist sample is dried in an appropriate tray with a large surface area.

Internal Strength of a Dried Paper Sheet Obtained

A dried paper sheet obtained is examined after storage in a climatic room at constant 23° C. and 50% humidity for 12 hours. The internal strength is carried out according to a procedure that complies with Tappi regulation T833 pm-94. This involves cutting 10 strips of paper 2.5 cm wide and 12.7 cm long from two sheets of A4 paper previously obtained from the dried paper web of the test machine. Each individual paper sample is attached with double-sided adhesive tape to a separate base plate and a metal bracket. The metal angle is knocked out with a pendulum, splitting the paper sample to be tested in a plane parallel to the paper surface. The energy required for this process is measured. The device used for the measurement is an Internal Bond Test Station from TMI (Testing Machines Inc. Islandia, N.Y. USA). The double-sided adhesive tape is a product of 3M (width 25.4 mm type Scotch no. 140). The measuring instrument supplies the energy required for the splitting process, based on a standardized area in J/m2. The average value of 10 individual measurements is calculated.

B-2) Production of the Paper Raw Material

The raw material for paper production is a pulp, which is produced by beating paper webs in a pulper. The pulp is obtained by dissolving it in drinking water and mechanically processing the paper webs in the pulper at a dry content of approx. 3.5% by weight. The pulp then typically has a fineness around 50° Schopper Riegler. The paper webs are packaging raw papers of the specification "Testliner 2" with a grammage of 120 g/m², which come from Thurpapier in Weinfelden (Switzerland).

B-3) Treatment of the Paper Raw Material with Additives

The paper raw material is treated with additives either in "thick stock" at a dry content of 3.5% by weight or in "thin stock" at a dry content of 0.8% by weight.

In case of "thick stock treatment" 500 g pulp with a dry content of 3.5% by weight is placed in a large glass beaker. The additive is then added with stirring as a 2% by weight solution based on polymer content. Substances are treated with 1.315 g 2% by weight additive solution based on polymer content or with 2.63 g 2% by weight additive solution based on polymer content. This corresponds to a treatment with 0.15% or 0.3% polymer content based on dry pulp.

Subsequently, 100 g of the treated pulp is transferred into another glass vessel and then diluted with drinking water to a concentration of 0.8% by weight dry content.

In the case of thin stock treatment, 114.3 g of pulp with a dry content of 3.5% by weight is placed in a large glass beaker. The pulp is then diluted with drinking water to a concentration of 0.8% by weight dry content. The additive is added with stirring as a 2% by weight solution based on polymer content. Pulp is treated with 0.3 g additive solution based on polymer content or 0.6 g additive solution based on polymer content. This corresponds to a treatment with 0.15% and 0.3% polymer content based on dry pulp.

B-4) Papers Production

The aim is to produce paper sheets with a grammage of 120 g/m2 starting from a pulp treated with an additive which has a dry content of 0.8% by weight before the additive treatment or a pulp which has a dry content of 0.8% by weight but is not treated with an additive (=reference). The paper sheets are produced on a dynamic sheet former by TechPap (France). A paper stock suspension, here the treated or untreated pulp, is sprayed onto a wire. The wire is clamped in a vertical, rapidly rotating drum. The dehydration and sheet formation in this system is determined not only by the sheet structure, but above all by the centrifugal forces within the rotating drum. By varying the speed of rotation of the drum, the centrifugal force acting on the resulting sheet structure may also be varied. The result is a variation of the dehydration of the wet paper structure, which leads to a variation of the dry content in the wet paper structure. What is meant here is the dry content of the wet paper structure immediately after removal from the water-permeable substrate (wire), which is clamped in the drum of the dynamic sheet former. The wet paper structure may also be referred to herein as a wet paper sheet, but this does not expressly refer to a re-wetted, previously dried paper sheet.

The number of drum revolutions is varied in 5 steps between 600 and 1100 revolutions per minute, whereby dry contents in the range between 15% by weight and 21% by weight may be adjusted. A small part of the still wet paper structure is used for the immediate determination of the dry content after the removal of the wet paper structure from the wire of the dynamic sheet former. For each setting, wet paper structures with two different dry contents between 17% by weight and 21% by weight are produced.

After removal of the wet paper structure from the drum of the dynamic sheet former, the wet paper sheets are covered on both sides with blotting paper and pressed in a static press at 6 bar for 30 seconds. Moist paper sheets are obtained, whose dry content after pressing is typically between 41% by weight and 43% by weight. If the dry content falls significantly below the lower value, the thickness of the blotting paper or the number of sheets applied may be increased to reach the above range.

The resulting moist paper sheet is then covered again on both sides with fresh blotting paper and then clamped in a drying cylinder for 10 minutes. The surface temperature of the drying cylinder is approx. 100° C. After drying, the dry paper sheets obtained are placed in an air-conditioned room for conditioning.

B-5) Papers Produced

As reference examples, three wet paper structures or wet paper sheets with dry contents of 15.3% by weight, 17.6% by weight and 20.2% by weight respectively are produced. The wet paper structure or wet paper sheets are then pressed and the resulting moist paper sheets are then dried.

As comparative examples, wet paper structures or wet paper sheets are prepared with one of the additives 1 to 8 in two dosage quantities (1.5 g and 3 g polymer content relative to 1 kg dry pulp) and one dosage of the corresponding dosage quantity in the thick stock and one dosage quantity in the thin stock. The dry content of the produced wet paper structure or wet paper sheets is below 18.5% by weight. The wet paper structure or wet paper sheets are then pressed and the resulting moist paper sheets are then dried.

As comparative examples IIa, wet paper structures or wet paper sheets are produced with one of the additives 9 to 11 each with two dosage quantities each (1.5 g and 3 g polymer content based on 1 kg dry pulp) and one dosage of the corresponding dosage quantity in the thick stock and in the thin stock. The dry content of the produced wet paper structure or wet paper sheets is below 18.5% by weight. The wet paper structure or wet paper sheets are then pressed and the resulting moist paper sheets are then dried.

As comparative examples IIb, wet paper structures or wet paper sheets are produced with one of the additives 9 to 11 each with two dosage quantities each (1.5 g and 3 g polymer content based on 1 kg dry pulp) and one dosage of the corresponding dosage quantity in the thick stock and in the thin stock. The dry content of the produced wet paper structure or wet paper sheets is above 18.5% by weight. The wet paper structure or wet paper sheets are then pressed and the resulting moist paper sheets are then dried.

As examples of the invention, wet paper structures or wet paper sheets are produced with one of the additives 1 to 8 each with two dosage quantities each (1.5 g and 3 g polymer content based on 1 kg dry pulp) and one dosage of the corresponding dosage quantity each in the thick stock and in the thin stock. The dry content of the produced wet paper structure or wet paper sheets is above 18.5% by weight. The wet paper structure or wet paper sheets are then pressed and the resulting moist paper sheets are then dried.

B-6) Internal Strength of the Dry Paper Sheets Produced

Tables TabB1 and TabB2 show the internal strengths of the papers produced when additives are added to the thin stock, and Tables TabB3 and TabB4 show those when additives are added to the thick stock.

TABLE TabB1

| 1.5 g polymer content per 1 kg paper stock when added to thin stock | | | | | |
|---|---|---|---|---|---|
| Example no. | Additive | Dry content [% by weight] | Internal strength [$J/m^2$] | Dry content [% by weight] | Internal strength [$J/m^2$] |
| 1[a] | — | 15.3 | 144 | | |
| 2[a] | — | 17.6 | 148 | | |
| 3[a] | — | | | 20.2 | 141 |
| B1-1[a] | 9 | 15.3 | 171 | | |
| B1-2[a] | 9 | | | 18.9 | 174 |
| B1-3[a] | 10 | 17.6 | 155 | | |
| B1-4[a] | 10 | | | 19.2 | 156 |
| B1-5[a] | 11 | 17.2 | 164 | | |
| B1-6[a] | 11 | | | 19.3 | 163 |
| B1-7[a] | 1 | 17.6 | 161 | | |
| B1-8[b] | 1 | | | 19.5 | 229 |
| B1-9[a] | 2 | 17.8 | 157 | | |
| B1-10[b] | 2 | | | 19.4 | 223 |
| B1-11[a] | 3 | 17.6 | 164 | | |
| B1-12[b] | 3 | | | 19.7 | 216 |
| B1-13[a] | 4 | 16.9 | 167 | | |
| B1-14[b] | 4 | | | 19.5 | 221 |
| B1-15[a] | 5 | 17.3 | 157 | | |
| B1-16[b] | 5 | | | 20 | 224 |
| B1-17[a] | 6 | 17.4 | 168 | | |
| B1-18[b] | 6 | | | 20.1 | 220 |
| B1-19[a] | 7 | 17.3 | 163 | | |
| B1-20[b] | 7 | | | 19.4 | 213 |

TABLE TabB1-continued

| 1.5 g polymer content per 1 kg paper stock when added to thin stock | | | | | |
|---|---|---|---|---|---|
| Example no. | Additive | Dry content [% by weight] | Internal strength [$J/m^2$] | Dry content [% by weight] | Internal strength [$J/m^2$] |
| B1-21[a] | 8 | 17.6 | 161 | | |
| B1-22[b] | 8 | | | 19.1 | 207 |

Footnotes:
[a] Comparative
[b] According to invention

TABLE TabB2

| 3.0 g polymer content per 1 kg paper stock when added to thin stock | | | | | |
|---|---|---|---|---|---|
| Example no. | Additive | Dry content [% by weight] | Internal strength [$J/m^2$] | Dry content [% by weight] | Internal strength [$J/m^2$] |
| 1[a] | — | 15.3 | 144 | | |
| 2[a] | — | 17.6 | 148 | | |
| 3[a] | — | | | 20.2 | 141 |
| B2-1[a] | 9 | 17.9 | 185 | | |
| B2-2[a] | 9 | | | 19.4 | 189 |
| B2-3[a] | 10 | 17.4 | 176 | | |
| B2-4[a] | 10 | | | 19 | 180 |
| B2-5[a] | 11 | 17.6 | 181 | | |
| B2-6[a] | 11 | | | 19.4 | 181 |
| B2-7[a] | 1 | 17.9 | 177 | | |
| B2-8[b] | 1 | | | 19.7 | 267 |
| B2-9[a] | 2 | 18.2 | 174 | | |
| B2-10[b] | 2 | | | 19.8 | 276 |
| B2-11[a] | 3 | 17.7 | 183 | | |
| B2-12[b] | 3 | | | 20.0 | 271 |
| B2-13[a] | 4 | 17.5 | 180 | | |
| B2-14[b] | 4 | | | 19.9 | 262 |
| B2-15[a] | 5 | 17.3 | 188 | | |
| B2-16[b] | 5 | | | 19.8 | 275 |
| B2-17[a] | 6 | 17.6 | 174 | | |
| B2-18[b] | 6 | | | 20.0 | 261 |
| B2-19[a] | 7 | 17.7 | 179 | | |
| B2-20[b] | 7 | | | 19.9 | 271 |
| B2-21[a] | 8 | 17.9 | 171 | | |
| B2-22[b] | 8 | | | 19.4 | 262 |

Footnotes:
[a] Comparative
[b] According to invention

TABLE TabB3

| 1.5 g polymer content per 1 kg paper stock when added to thick stock | | | | | |
|---|---|---|---|---|---|
| Example no. | Additive | Dry content [% by weight] | Internal strength [$J/m^2$] | Dry content [% by weight] | Internal strength [$J/m^2$] |
| 1[a] | — | 15.3 | 144 | | |
| 2[a] | — | 17.6 | 148 | | |
| 3[a] | — | | | 20.2 | 141 |
| B3-1[a] | 9 | 18.1 | 166 | | |
| B3-2[a] | 9 | | | 19.2 | 159 |
| B3-3[a] | 10 | 17.3 | 169 | | |
| B3-4[a] | 10 | | | 19.3 | 162 |
| B3-5[a] | 11 | 16.9 | 159 | | |
| B3-6[a] | 11 | | | 19.1 | 155 |
| B3-7[a] | 1 | 17.3 | 156 | | |
| B3-8[b] | 1 | | | 19.3 | 231 |
| B3-9[a] | 2 | 17.4 | 164 | | |
| B3-10[b] | 2 | | | 19.2 | 226 |
| B3-11[a] | 3 | 17.1 | 154 | | |
| B3-12[b] | 3 | | | 20.4 | 218 |

TABLE TabB3-continued 1.5 g polymer content per 1 kg paper stock when added to thick stock

| Example no. | Additive | Dry content [% by weight] | Internal strength [J/m²] | Dry content [% by weight] | Internal strength [J/m²] |
|---|---|---|---|---|---|
| B3-13[a] | 4 | 17.2 | 156 | | |
| B3-14[b] | 4 | | | 19.7 | 237 |
| B3-15[a] | 5 | 17.0 | 163 | | |
| B3-16[b] | 5 | | | 19.6 | 223 |
| B3-17[a] | 6 | 17.9 | 155 | | |
| B3-18[b] | 6 | | | 19.7 | 218 |
| B3-19[a] | 7 | 16.8 | 155 | | |
| B3-20[b] | 7 | | | 19.7 | 225 |
| B3-21[a] | 8 | 17.2 | 157 | | |
| B3-22[b] | 8 | | | 18.9 | 221 |

Footnotes:
[a]Comparative
[b]According to invention

TABLE TabB4

3.0 g polymer content per 1 kg paper stock when added to thick stock

| Example no. | Additive | Dry content [% by weight] | Internal strength [J/m²] | Dry content [% by weight] | Internal strength [J/m²] |
|---|---|---|---|---|---|
| 1[a] | — | 15.3 | 144 | | |
| 2[a] | — | 17.6 | 148 | | |
| 3[a] | — | | | 20.2 | 141 |
| B4-1[a] | 9 | 17.8 | 178 | | |
| B4-2[a] | 9 | | | 19.5 | 172 |
| B4-3[a] | 10 | 17.8 | 179 | | |
| B4-4[a] | 10 | | | 19.9 | 185 |
| B4-5[a] | 11 | 17.3 | 175 | | |
| B4-6[a] | 11 | | | 18.9 | 176 |
| B4-7[a] | 1 | 16.9 | 175 | | |
| B4-8[b] | 1 | | | 19.1 | 284 |
| B4-9[a] | 2 | 18.1 | 177 | | |
| B4-10[b] | 2 | | | 20.1 | 274 |
| B4-11[a] | 3 | 17.4 | 169 | | |
| B4-12[b] | 3 | | | 20.6 | 282 |
| B4-13[a] | 4 | 17.9 | 169 | | |
| B4-14[b] | 4 | | | 20.2 | 295 |
| B4-15[a] | 5 | 17.5 | 179 | | |
| B4-16[b] | 5 | | | 20.3 | 279 |
| B4-17[a] | 6 | 18.0 | 176 | | |
| B4-18[b] | 6 | | | 19.9 | 283 |
| B4-19[a] | 7 | 17.4 | 176 | | |
| B4-20[b] | 7 | | | 19.7 | 265 |
| B4-21[a] | 8 | 17.5 | 173 | | |
| B4-22[b] | 8 | | | 19.3 | 276 |

Footnotes:
[a]Comparative
[b]According to invention

Tables TabB1 to TabB4 show for the produced dry paper sheets that
- ($i_B$) a dry content of the wet paper structure or wet paper sheet of between 15.3% by weight and 20.2% by weight does not cause a difference in the internal strength of the dry paper sheet in the reference examples without additive 1 to 11,
- ($ii_B$) a dry content of the wet paper structure or wet paper sheet between 15.3% by weight and 19.9% by weight does not cause a difference in the internal strength of the dry paper sheet in comparative examples IIa and IIb with an additive 9 to 11,
- ($iii_B$) a dry content of the wet paper structure or wet paper sheet above 18.5% by weight causes a significant increase in the internal strength of the dry paper sheet examples according to invention with an additive 1 to 8, this increase being related to the internal strengths of the dry paper sheets in the comparison examples I with an additive 1 to 8, the difference in a dry content of the wet paper structure or wet paper sheet being below 18.5% by weight,
- ($iv_B$) the addition of an additive 1 to 8 to a pulp with a dry content of 3.5% by weight and subsequent dilution to 0.8% by weight tends to give higher internal strength compared with the addition of the same additive to a pulp with a dry content of 0.8% by weight, especially when 3.0 g of additive is added instead of 1.5 g of additive.

Tables TabA1 and TabA2 show for the additives 1 to 11:
- ($i_A$) a content of polymerized 10 mol % DADMAC is a difference between additive 5 according to the invention and the comparative additive 10, in which instead of DADMAC more N-vinylformamide is used in the polymerization of its precursor V10,
- ($ii_A$) a content of polymerized 35 mol % N-vinylformamide is a difference for the precursor V2 of additive 2 according to the invention compared to additive 11, in whose precursor V11 5 mol % less N-vinylformamide is polymerized and instead 5 mol % more DADAMAC is polymerized,
- ($iii_A$) a degree of hydrolysis of 88% of all N-vinylformamide monomers polymerized in its precursor V8 is a difference of additive 8 according to the invention compared to additive 9, which has a degree of hydrolysis of 85% of all N-vinylformamide monomers polymerized in its precursor V9.

The invention claimed is:

1. Method for the production of paper or cardboard comprising the following steps:
   (A) Adding a water-soluble polymer P to a first aqueous pulp suspension having a dry content between 0.1% by weight and 6% by weight, thereby forming a second aqueous pulp suspension containing polymer P, wherein polymer P is obtainable by radical polymerization to a polymer V of
   (i) 33 to 83 mol % of a monomer of formula I

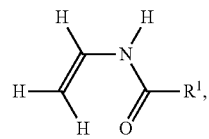

in which $R^1$=H or $C_1$-$C_6$ alkyl,
   (ii) 6 to 56 mol % of diallyl dimethyl ammonium chloride, diallyl diethyl ammonium chloride or a salt form of a monoethylenically unsaturated monomer with a quaternized nitrogen as the sole charge-bearing group at a pH value of 7,
   (iii) 11 to 61 mol % of a monoethylenically unsaturated carboxylic acid, a monoethylenically unsaturated sulfonic acid or a monoethylenically unsaturated phosphonic acid, or salt forms thereof,
   (iv) 0 to 50 mol % of one or more ethylenically unsaturated monomers other than monomer (i), (ii) and (iii),
   wherein the total amount of all monomers (i), (ii), (iii) and (iv) is 100 mol %, and hydrolyzing the N—C(=O)R¹ groups of the units of the monomers of formula (I) polymerized into polymer V to form primary amino or amidine groups to polymer P, wherein at least 87% of the units of the monomers of formula (I) polymerized into polymer V are hydrolyzed, based on the number of all units of the monomers of formula I polymerized into polymer V, (B) dehydrating the second aqueous pulp suspension containing polymer P on a water-permeable substrate to a wet paper structure having a dry content between 18.5% by weight and 25% by weight, (C) dehydrating the wet paper structure, resulting in the paper or cardboard.

2. Method according to claim 1, wherein the water-permeable substrate is a sieve.

3. Method according to claim 1, wherein the amount of monomer (i) is 33 to 65 mol %.

4. Method according to claim 1, wherein the amount of monomer (ii) is 6 to 45 mol %.

5. Method according to claim 1, wherein the amount of monomer (iii) is 11 to 40 mol %.

6. Method according to claim 1, wherein the amount of monomer (iv) is 0 to 30 mol %.

7. Method according to claim 1, wherein for monomer (i) $R^1$=H.

8. Method according to claim 1, wherein monomer (ii) is diallyl dimethyl ammonium chloride, diallyl diethyl ammonium chloride, a salt form of an N-alkyl-N'-vinylimidazolium, a salt form of an N-alkylated vinylpyridinium, a salt form of an acrylic amidoalkyl trialkylammonium or a salt form of a methacrylamidoalkyl trialkylammonium.

9. Method according to claim 8, wherein monomer (ii) is diallyl dimethyl ammonium chloride.

10. Method according to claim 1, wherein monomer (iii) is a mono-ethylenically unsaturated $C_3$-$C_8$ mono- or dicarboxylic acid, acrylamido-2-methylpropane sulfonic acid, or salt forms thereof.

11. Method according to claim 10, wherein monomer (iii) is acrylic acid, methacrylic acid, acrylamido-2-methylpropanesulfonic acid or salt forms thereof.

12. Method according to claim 11, wherein monomer (iii) is acrylic acid or methacrylic acid or its sodium salt or potassium salt.

13. Method according to claim 1, wherein monomer (iv) is acrylonitrile, vinyl acetate, N-vinylpyrrolidone or N-vinylimidazole.

14. Method according to claim 1, wherein polymer P is amphoteric-cationic.

15. Method according to claim 1, wherein in step (C) the dehydration comprises the following steps:
(C-1) dehydrating the wet paper structure by pressing, resulting in a moist paper sheet,
(C-2) dehydrating the moist paper sheet by heat input, resulting in the paper or card board.

16. Method according to claim 1, wherein the amount of added polymer P is 0.01% by weight to 6.0% by weight based on the dry content of the first aqueous pulp suspension.

17. Method according to claim 1, wherein in step (A) polymer P is added to a first pulp suspension, the dry content of which is greater than 1.5% by weight and up to 6.0% by weight, and the second pulp suspension containing polymer P is diluted to a dry content between 0.1% by weight and up to 1.5% by weight.

18. Method according to claim 1, wherein in step (A) a further organic polymer other than polymer P is added to the first pulp suspension or the second pulp suspension containing polymer P.

19. Method according to claim 1, wherein in step (A) a filler is added to the first pulp suspension or the second pulp suspension containing polymer P.

20. A water-soluble polymer P obtainable by
radical polymerization to a polymer V of
(i) 33 to 83 mol % of a monomer of formula I

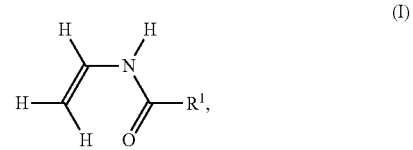

in which $R^1$=H or $C_1$-$C_6$ alkyl,
(ii) 6 to 56 mol % of diallyl dimethyl ammonium chloride, diallyl diethyl ammonium chloride or a salt form of a monoethylenically unsaturated monomer with a quaternized nitrogen as the sole charge-bearing group at a pH value of 7,
(iii) 11 to 61 mol % of a monoethylenically unsaturated carboxylic acid, a monoethylenically unsaturated sulfonic acid or a monoethylenically unsaturated phosphonic acid, or salt forms thereof,
(iv) 0 to 50 mol % of one or more ethylenically unsaturated monomers other than monomer (i), (ii) and (iii),
wherein the total amount of all monomers (i), (ii), (iii) and (iv) is 100 mol %, and
hydrolyzing the N—C(=O)R¹ groups of the units of the monomers of formula (I) polymerized into polymer V to form primary amino or amidine groups to polymer P, wherein at least 87% of the units of the monomers of formula (I) polymerized into polymer V are hydrolyzed, based on the number of all units of the monomers of formula I polymerized into polymer V.

\* \* \* \* \*